(12) United States Patent
Qi et al.

(10) Patent No.: US 7,058,388 B2
(45) Date of Patent: Jun. 6, 2006

(54) METHOD AND SYSTEM FOR PRESENTATION OF CONTENT FROM ONE CELLULAR PHONE TO ANOTHER THROUGH A COMPUTER NETWORK

(75) Inventors: Naizhen Qi, Yokohama (JP); Xiaozhou Wang, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 10/845,049

(22) Filed: May 13, 2004

(65) Prior Publication Data

US 2005/0032512 A1 Feb. 10, 2005

Related U.S. Application Data

(62) Division of application No. 09/947,738, filed on Sep. 6, 2001, now Pat. No. 6,892,064.

(30) Foreign Application Priority Data

Sep. 7, 2000 (JP) ............................. 2000-272213

(51) Int. Cl.
*H04M 11/00* (2006.01)
(52) U.S. Cl. ...................... 455/406; 455/407; 455/408; 455/414.1; 379/201.12
(58) Field of Classification Search ................ 455/406, 455/407, 408, 414.1, 412.1; 379/201.12
See application file for complete search history.

(56) References Cited

U.S. PATENT DOCUMENTS

| | | | |
|---|---|---|---|
| 5,666,107 A | 9/1997 | Lockhart et al. | 340/827 |
| 6,058,170 A | 5/2000 | Jagadish et al. | 379/114 |
| 6,484,205 B1 | 11/2002 | Byford | 709/227 |
| 6,501,837 B1 | 12/2002 | Adler et al. | 379/210.01 |
| 6,697,469 B1 * | 2/2004 | Koster | 379/114.29 |
| 2001/0036822 A1 | 11/2001 | Mead et al. | 455/414 |
| 2001/0053683 A1 * | 12/2001 | Murayama et al. | 455/406 |
| 2003/0023550 A1 | 1/2003 | Lee | 705/40 |

FOREIGN PATENT DOCUMENTS

| | | |
|---|---|---|
| JP | 08-009053 | 1/1996 |
| JP | 10-164123 | 9/1998 |
| JP | 11-120398 | 4/1999 |
| JP | 2000-059353 | 2/2000 |
| JP | 2000-232550 | 8/2000 |

\* cited by examiner

*Primary Examiner*—Ovidio Escalante
*Assistant Examiner*—Emeka Iwuchukwu
(74) *Attorney, Agent, or Firm*—Duke W. Yee; A. Bruce Clay; Gerald H. Glanzman

(57) ABSTRACT

A cellular phone issues a request for content from a server. The cellular requests and authorizes the content for use by another cellular phone. When the content is received by the second cellular phone, the first cellular phone is billed.

6 Claims, 24 Drawing Sheets

FIG. 6
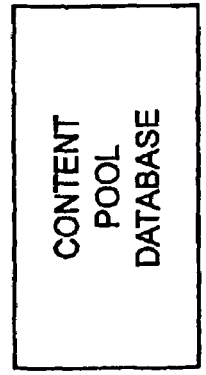
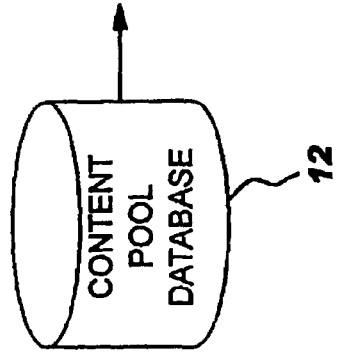

FIG. 8

USER TABLE ~13a

| USER ID | USER NAME | CARRIER | CARRIER ID |
|---|---|---|---|
| 1 | user a | 1(XXXXXX) | uid=ABCDEF123456 |
| 2 | user b | 2(Y-YYYYY) | YYYYuid=3457890 |

DATA DISTRIBUTION TABLE ~13b

| DISTRIBUTION ID | USER ID | DISTRIBUTION ADDRESS | DESTINATION CARRIER | CONTENT ID | DISTRIBUTION DAT/TIME | TRANSACTION ID |
|---|---|---|---|---|---|---|
| 00001 | 1 | 090-aaaa-bbb | 1(XXXXXX) | 1 | 2000.08.23.18.00.0000 | i1287979 |
| 00002 | 2 | 090-37894561 | 2(Y-YYYY) | 2 | 2000.08.26.02.14.25661 | j4569872 |

CHARGING TABLE ~13c

| CHARGING ID | DISTRIBUTION ID | USER ID | CHARGE | CHARGE COLLECTED | TRANSACTION ID |
|---|---|---|---|---|---|
| 34509 | 00001 | 1 | 100 | Y | i1287969 |
| 45678 | 000021 | 2 | 500 | N | j4569872 |

USER MANAGEMENT/CHARGING DATABASE

USER MANAGEMENT/CHARGING DATABASE ~13

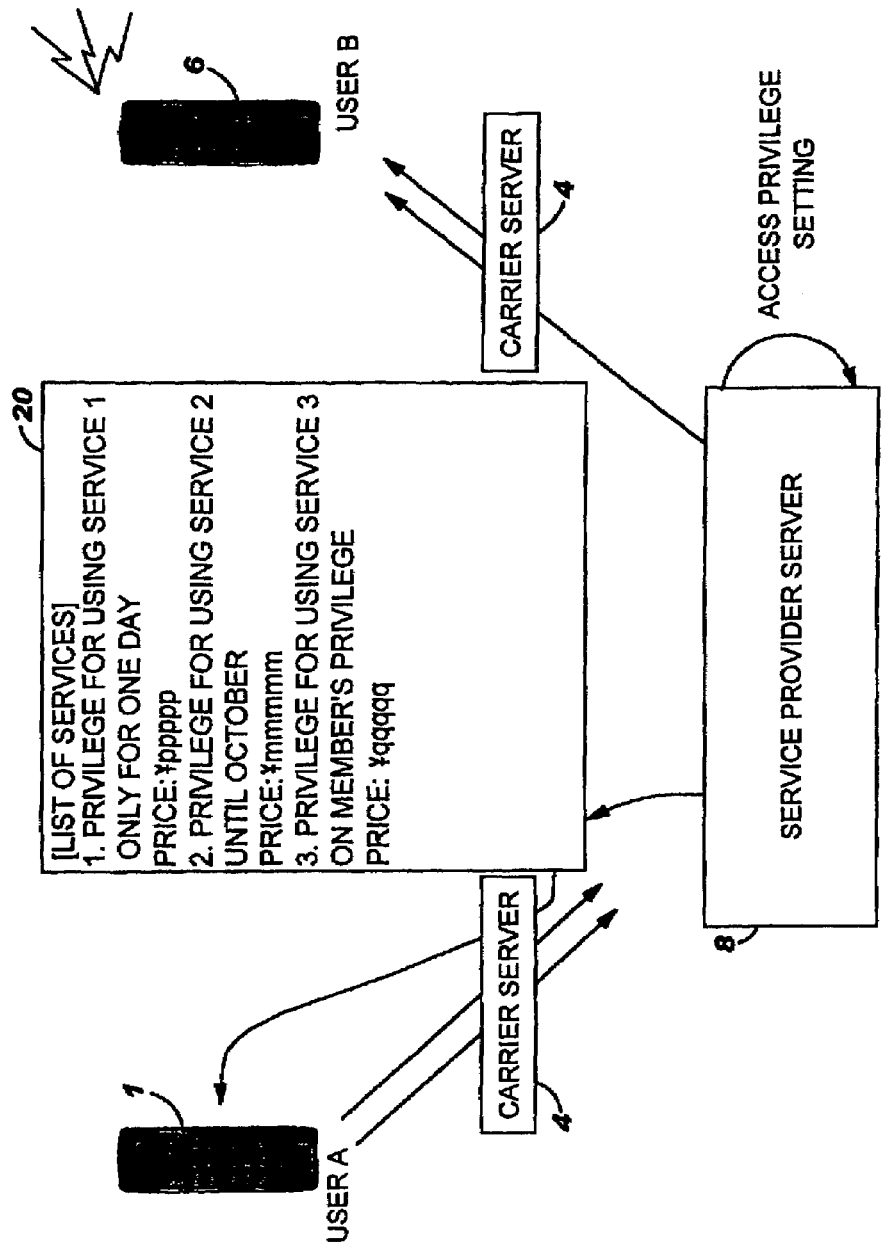

METHOD AND SYSTEM FOR PRESENTATION OF CONTENT FROM ONE CELLULAR PHONE TO ANOTHER THROUGH A COMPUTER NETWORK

This application is a divisional of application Ser. No. 09/947,738, filed Sep. 6, 2001, now U.S. Pat. No. 6,892,064, which is herein incorporated by reference.

FIELD OF THE INVENTION

The present invention relates in general to computer software, and in particular to a content presentation system that provides digital content between cellular phones.

BACKGROUND OF THE INVENTION

A well-known system provides content such as a greeting card configured by digital information via a network such as the Internet. In such a conventional system, a provider server included in the system sends mail as a notice that includes a URL (Uniform Resource Locator) for a greeting card to an object user terminal. After receiving this notice mail, the user accesses the specified URL and enters necessary identifiers (such as a certification code included in the notice mail) and browses content as a card addressed to him/her.

In the case of the conventional system described above, the user who receives the gift is required to have a terminal device such as a personal computer that can access a specific network, such as the Internet. Additionally, the user who has received the notice mail is required to access a linked URL again to receive the content. If the addressee is using a personal computer, the user might not become aware of the notice mail for some time. The user will thus browse the greeting card much later than the time expected by the presenter. This has been a problem from such a conventional system.

There is also another well-known system that presents a user with a privilege for receiving a service via a network. When using a personal computer, however, personal identification security might not be sufficient, whereby illegal accesses cannot be properly prevented. While each user may be enabled with a password and a user ID, the system can become too complicated, requiring an additional software program to cope with the complicated system.

In order to present services such as content to enable another user to access a specific site, etc., each presenter user is requested to register his/her personal information which may include name, credit card number, age, etc. with the content provider beforehand. The user is further requested to enter other information to allow another user to access the content and/or service presented by the presenter user. Therefore, such a system will not be so user friendly.

There are also pagers, having a well-known push-button type portable terminal that employs radio communications. However, the pager is only used to receive information; it cannot supply services interactively via a network, for example, by accessing a linked URL.

However, the spread of cellular phones that can access the Internet has grown considerably. Therefore, it is now much easier to access a network such as the Internet. Many cellular phones are enabled to receive and disply a variety of content consisting of characters, music, voices, etc. on their liquid crystal displays. Corporations that supply networks for cellular phones (hereinafter, to be referred to as carriers) can obtain personal information about the users as described above when the cellular phones are registered. Additionally, these cellular phones are provided with a function for certifying user identification for enabling communications. This is why a user's identification will be easier for a cellular phone than terminals such as personal computers.

SUMMARY OR THE INVENTION

It is an object of the present invention to provide faster interactive services with a higher level of security and improved usability by relating each content/service presenter to the content/service receiver having a unique personal certification function such as found on a cellular phone. It is another object of the present invention to provide a server, a content presentation method, and a recording medium that stores a computer readable program for executing the content presentation method employed to realize a content presentation system.

The present invention provides a first cellular phone that requests presentation of content via a network, a second cellular phone to be presented with the content, a provider server that holds the content, a carrier server consisting of a first carrier server related to the first cellular phone, and a second carrier server related to the second cellular phone. The first carrier server includes means for receiving a content presentation request from the first cellular phone; a database for storing identification information of the first cellular phone and information related to the second cellular phone; means for sending content information received from the first cellular phone, identification information of the second cellular phone, and information related to the second cellular phone to the provider server; and means for receiving payment information related to the content sent by the second carrier server that receives the requested content from the provider server. The carrier server of the present invention makes it is possible to provide a content presentation system that can charge a user according to the content with higher usability due to the personal identification function of a cellular phone.

The first carrier server of the present invention changes its time for receiving the charging information according to the content. The second carrier server of the present invention includes means for communicating arrival of requested content to the second cellular phone. Both the first and second carrier servers of the present invention are included in the same cellular phone carrier. Each content of the present invention includes service use permitting information and the charging information is received by each user with use of the identification information of the first cellular phone after the service is used by the second cellular phone.

A provider server is connected to a first cellular phone to request presentation of content via a plurality of networks; a second cellular phone to be presented with the content; slave provider server for holding the content; a first carrier server related to the first cellular phone; and a second carrier server related to the second cellular phone. The provider server includes means for receiving content information from the first cellular phone, identification information of the first cellular phone, stored in a database of the first carrier server, and information related to the second cellular phone from the first carrier server respectively and means for sending the requested content to the second carrier server, so that the second carrier server sends the charging information related to the content to the first carrier server. The provider server of the present invention further includes means for issuing said charging information using said identification information of said first cellular phone. The provider server of the present invention further includes means for identifying the network used by the second cellular phone.

Furthermore, the present invention provides a content presentation method including the steps of: enabling a carrier server to receive a content presentation request from a first cellular phone via a network; deciding requested content information, identification information of the first cellular phone, and information related to a second cellular phone from the received content presentation request; sending requested content information received from the carrier server, identification information of the first cellular phone, information related to the second cellular phone to the provider server, sending the requested content to the second cellular phone via a predetermined network; and sending charging information issued by the provider server to the first cellular phone via the carrier server.

The content representation method of the present invention described above further includes the steps of: changing a time for sending the charging information according to the requested content; and identifying the predetermined network used by the second cellular phone from the information related to the second cellular information, so that the charging information is sent to the second cellular phone after the second cellular phone uses the service when the content is service use permitting information.

Furthermore, the present invention provides a carrier server process for providing a content via a network as content presentation. The carrier server process includes the steps of; of receiving a content presentation request from a first cellular phone via a network; deciding content information, identification information of the first cellular phone, and information of a second cellular phone to be presented with the content included respectively in the received content presentation request; sending the content information, identification information of the content presentation request source means, and information related to the second cellular phone to a provider server; receiving the charging information issued to the first cellular phone; including the charging information for the content presentation in the stored charging information of the first cellular phone; and changing a time for receiving the charging information according to the requested content. In the case of the present invention, the content includes service use permitting information and the step of including the charging information is executed after the second cellular phone accesses the service.

Furthermore, the present invention provides a provider server process for providing a content via a network as content presentation. The provider server process comprises the steps of: receiving a requested content information, identification information of the first cellular phone, and information related to a second cellular phone to be presented with the content, included respectively in a content presentation request sent from a first cellular phone to a carrier server via a network; sending said requested content to a predetermined network to which the second cellular phone belongs with use of information of the second cellular phone: and sending charging information related to the requested content to the carrier server at a time to be changed according to the requested content. In the case of the present invention, the content includes service use permitting information and the step of sending the charging information is executed after the second cellular phone uses the service.

Furthermore, the present invention provides a computer readable recording medium that stores a computer program for executing the content presentation method for providing contents via a network. The method executed by the computer program comprises the steps of: enabling a carrier server to receive a content presentation request from a first cellular phone via a network; deciding the requested content information, identification information of the first cellular phone, and information related to a second cellular phone from the received content representation request; enabling the carrier server to send the requested content information, identification information of the first cellular phone, and information related to the second cellular phone to the provider server; sending the requested content to the second cellular phone via a predetermined network; and enabling the provider server to send the charging information related to the first cellular phone to the first cellular phone via the carrier server.

In the case of the present invention, the method described above further includes the steps of: changing a time for sending the charging information according to the requested content; and identifying the predetermined network used by the second cellular phone, so that the charging information is sent to the second cellular phone after the service is used when the content is service use permitting information.

Furthermore, the present invention provides a computer readable recording medium that stores a carrier server program for executing the content presentation method described above. The method comprises the steps of: receiving a content presentation request from a first cellular phone via a network; deciding content information, identification information of the first cellular phone, and information related to a second cellular phone to be presented with the content included respectively in the received content presentation request; sending the content information, the identification information of the content presentation request source means, and the information related to the second cellular phone to a provider server; receiving charging information related to the first cellular phone; including the charging information related to the content presentation in the stored charging information related to the first cellular phone; and changing a time for receiving the charging information according to the requested content. In the case of the present invention, the content includes service use permitting information and the step of including the charging information is executed after the second cellular phone accesses the service.

Furthermore, the present invention provides a recording medium that stores a provider server program for executing the content presentation method that provides a content via a network as described above. The method comprises the steps of: receiving requested content information, identification information of the first cellular phone, and information related to a second cellular phone to be presented with the content included respectively in a content presentation request sent from a first cellular phone to a carrier server via a network; sending the requested content to a predetermined network to which the second cellular phone belongs with use of information related to the second cellular phone; and sending charging information related to the requested content to the carrier server at a time changed according to the requested content. In the case of the present invention, the content includes service use permitting information and the step of sending the charging information is executed after the second cellular phone uses the service.

BRIEF DESCRIPTION OF THE DRAWINGS

FIG. 6 is a data structure of a content pool database included in the carrier server of the present invention;

FIG. 8 is a data structure of a user management/charging database of the database included in the content provider server of the present invention;

FIG. 24 is another embodiment of the content presentation method of the present invention.

DETAILED DESCRIPTION OF THE INVENTION

Hereunder, the preferred embodiments of the present invention will be described with reference to the accompanying drawings. However, it is to be understood that modifications will be apparent to those skilled in the art without departing from the spirit of the invention.

Figure 1:
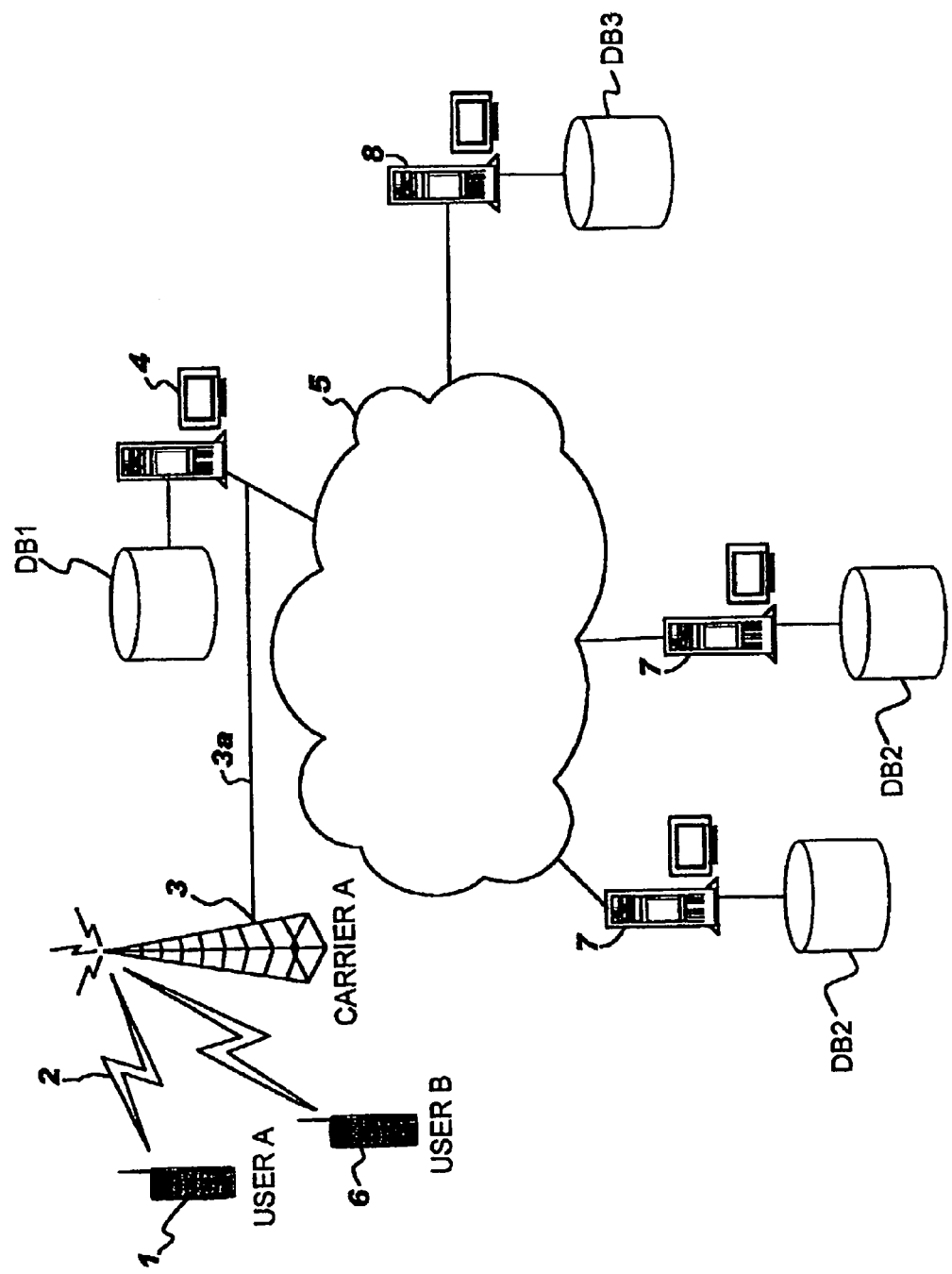
FIG. 1 is an embodiment of a content presentation system of the present invention.

FIG. 1 is a schematic block diagram of a content presentation system in a first embodiment of the present invention. The content presentation system of the present invention shown in FIG. 1 is configured by a cellular phone 1; an antenna 3 installed by a specific carrier to receive radio communications from this cellular phone 1 via a network 2 provided by a predetermined carrier; a public telephone line 3a used to transfer a signal received by the antenna 3; and such a network 5 such as the Internet connected to this network 2 via a carrier server 4 installed at the carrier.

The network 5 may be the Internet, as well as an optical communication network and a LAN/WAN that uses a proper communication protocol so as to send/receive data and information remotely. One of the protocols employable for such communications is, for example, TCP/IP.

The cellular phone 1 may be any type that can access a network 5 such as the Internet. For example, the cellular phone 1 may be replaced with a cellular phone that can use i-mode (a registered trademark) and/or Sky-mail (a registered trademark) services. The carrier of the present invention may be any one that includes such facility/means as a gateway used to access the network 5 (the Internet). The "contents" mentioned in the present invention comprise digital information including address information of URL sites that provide software programs and other specific services such as voice, image, music, etc., as well as access information required to use specific services, for example, linked addresses of specific URL sites, guidance of available information items, presenter information, notices of available privileges for admission to concerts, medical and caring services closely related to each cellular phone used as personal identification information like an ID card, information about shopping services on credit card for enabling a user B under the permission of a user A who is charged for the shopping.

In addition to the phone number, cellular phone 1 is provided with identification information specific to a carrier. According to this identification information, the cellular phone can be identified uniquely. Corresponding to this identification information, the carrier holds the personal information items of the user A, such as name, address, age, card number, bank account number, etc. In the case of the content presentation system of the present invention, a content presentation request from the cellular phone 1 is received by the antenna 3 via the predetermined network 2, then transferred to the carrier server 4 installed at a specific carrier via a public telephone line 3a, etc. In FIG. 1 the user of another cellular phone 6 belongs to the network 2 by the same carrier as that of the cellular phone 1. The user of the cellular phone 6 is presented with a privilege for accessing a specific available content or service.

This carrier server 4 connects the cellular phone 1 to the network 5 such as the Internet. The carrier server 4 receives a content presentation request from the cellular phone 1 and identifies the cellular phone 1 according to the identification information thereof. In the embodiment shown in FIG. 1, there is only one carrier server 4, but the present invention enables any number of carrier servers to be employed according to the storage capacity and the processing ability of the system. The carrier server 4 reads content information corresponding to the content requested, the identification information of the cellular phone 1, and the information of the user B to be presented with the content from the received content presentation request. The carrier server 4 includes a database DB1 configured by a charging database for storing charging information for users, a user certification database for storing personal information of respective users, and a content pool database for temporarily storing content received by the carrier server 4 until distributed to or down-loaded by the cellular phone 6.

The network 5 is connected to content provider servers 7 to provide content communicated to the carrier server 4 via the network 5. The carrier server 4 sends information to the content provider servers 7 via the network 5. The content provider servers 7 each include a database DB2 that stores various information items of each carrier, as well as information about the users A and B.

In the embodiment shown in FIG. 1, the carrier server 4 is connected to only two content provider servers 7, but the present invention enables any number of content providing servers to be connected to the network 5 according to the type of contents to be provided. In addition to the content provider servers 7 that provide digital information respectively, the carrier server 4 is also connected via the network 5 to a service provider server 8 that provides various services in accordance with access privileges. A service provider in the present invention means a provider of various services including information services. The service provider gives each user predetermined access privileges so as to provide those services.

In FIG. 1, the content provider servers 7 and the service provider server 8 are installed at different sites, but the present invention enables all the servers to be installed at the same site. The service provider server 8 includes a database DB3 and it is configured so as to set user information and an access privilege for each service presentation request.

The content provider servers 7, and the service provider server 8 may each be configured by a personal computer, work station, or large-scale computer. The personal computer or work station may employ a PENTIUM (trademark of Intel Corporation) or compatible CPU or various RISC chips and an operating system such as WINDOWS, WINDOWS NT trademarks of Microsoft Corporation, OS/2, AIX (trademarks of IBM Corporation), or UNIX LINUX. It is to be understood that the above listed CPU's and operating systems are provided as examples only and the present invention is not limited thereby.

Figure 2:
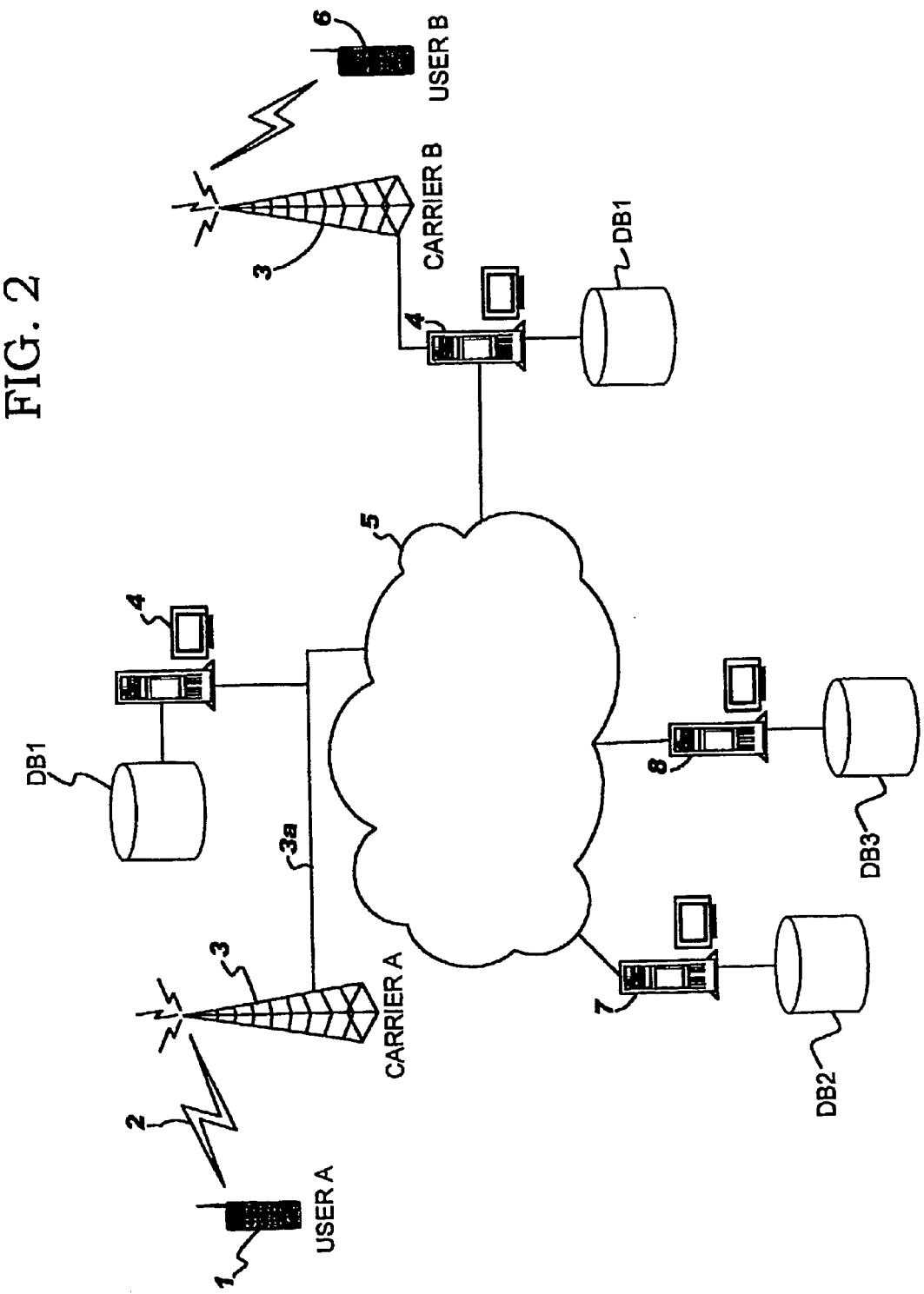
FIG. 2 is another embodiment of the content presentation system of the present invention.

FIG. 2 illustrates a second embodiment of the present invention. In FIG. 1, the cellular phones 1 and 6 receive content and services via the network 2 of the same carrier. However, the present invention also enables content to be provided from different carriers so that the cellular phone 1 can use the network of carrier A, while the cellular phone 6 can use the network of carrier B.

Figure 3:
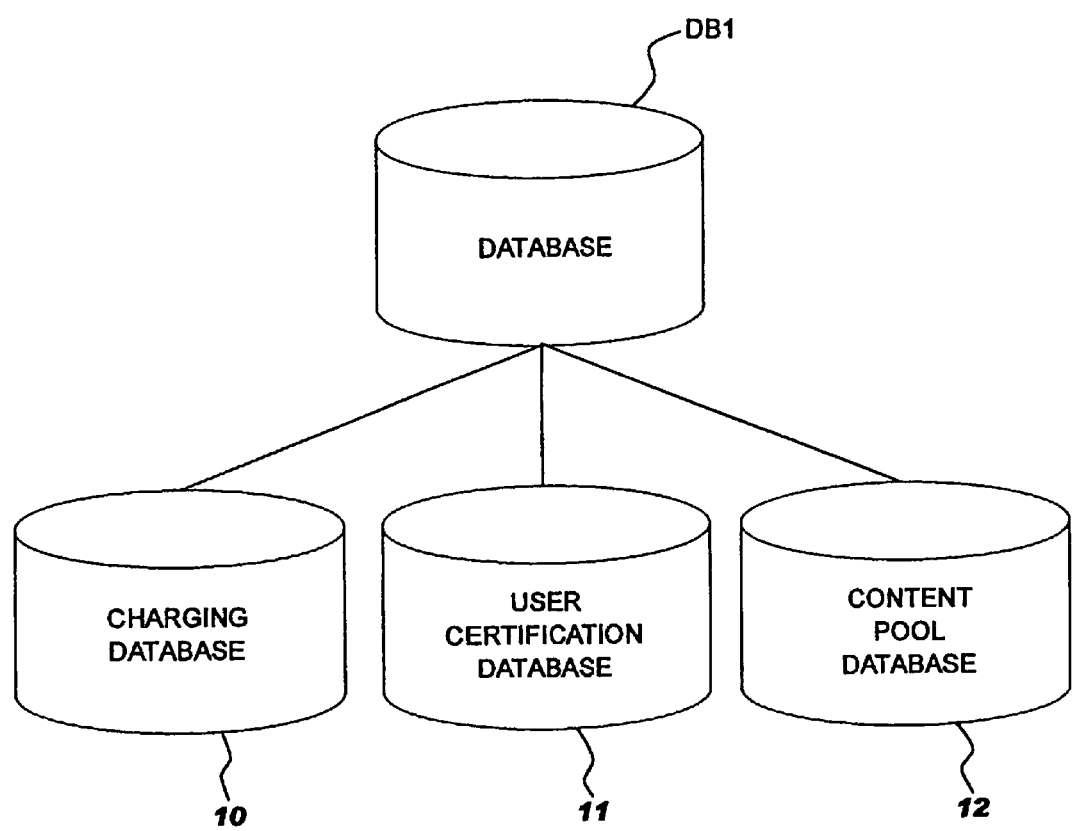
FIG. 3 is a structure of a database included in a carrier server of the present invention.

FIG. 3 shows a configuration of the database DB1 included in the carrier server 4 installed at a carrier site. The database DB1 is configured by a charging database 10, a user certification database 11, and a content pool database 12. The content pool database 12 is used to store content temporarily when the cellular phone 6 of the user B cannot be connected or fails in connection.

Figure 4:
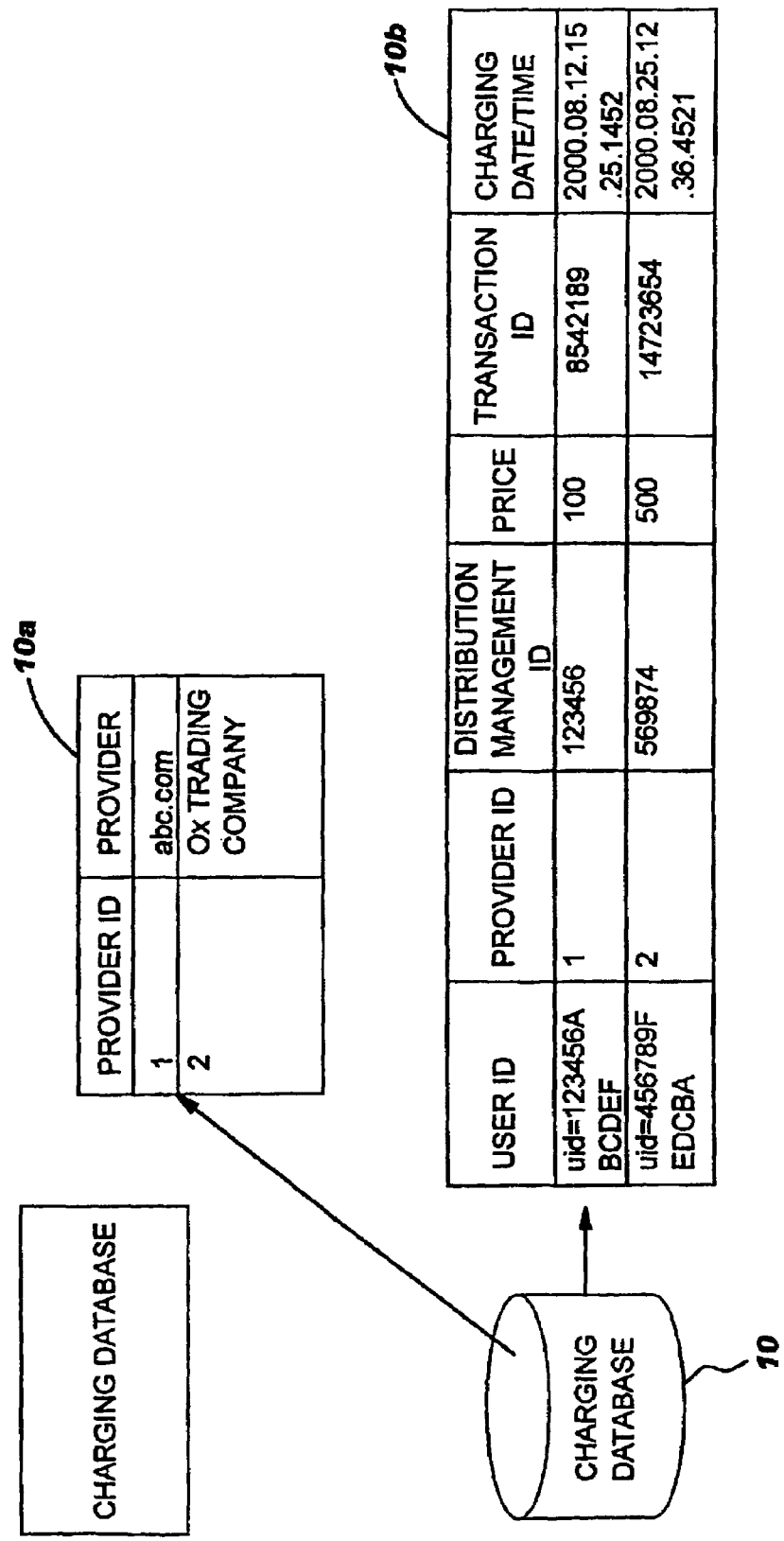
FIG. 4 is a data structure of a charging database included in the carrier server of the present invention.

FIG. 4 is a schematic view of the data structure of the charging database 10 shown in FIG. 3. The charging database comprises data class 10*a* (provider ID and name) and data class 10*b* (user ID, provider ID (each provider of content presentation requested from a user having this user ID), distribution management ID (used to manage the provided content), price corresponding to the content, transaction ID, and charging date). Charging database 10 may include charging information for normal communications, packet communications, etc. by the user of the cellular phone 1 so as to be classified by user ID. When a price is charged to the user A of the cellular phone 1, the charging information of the presented content may be combined with charging information of other items so as to be charged to the user A as a total. The present invention may also use another database for storing charging information for those normal communications, packet communications, etc.

Figure 5:
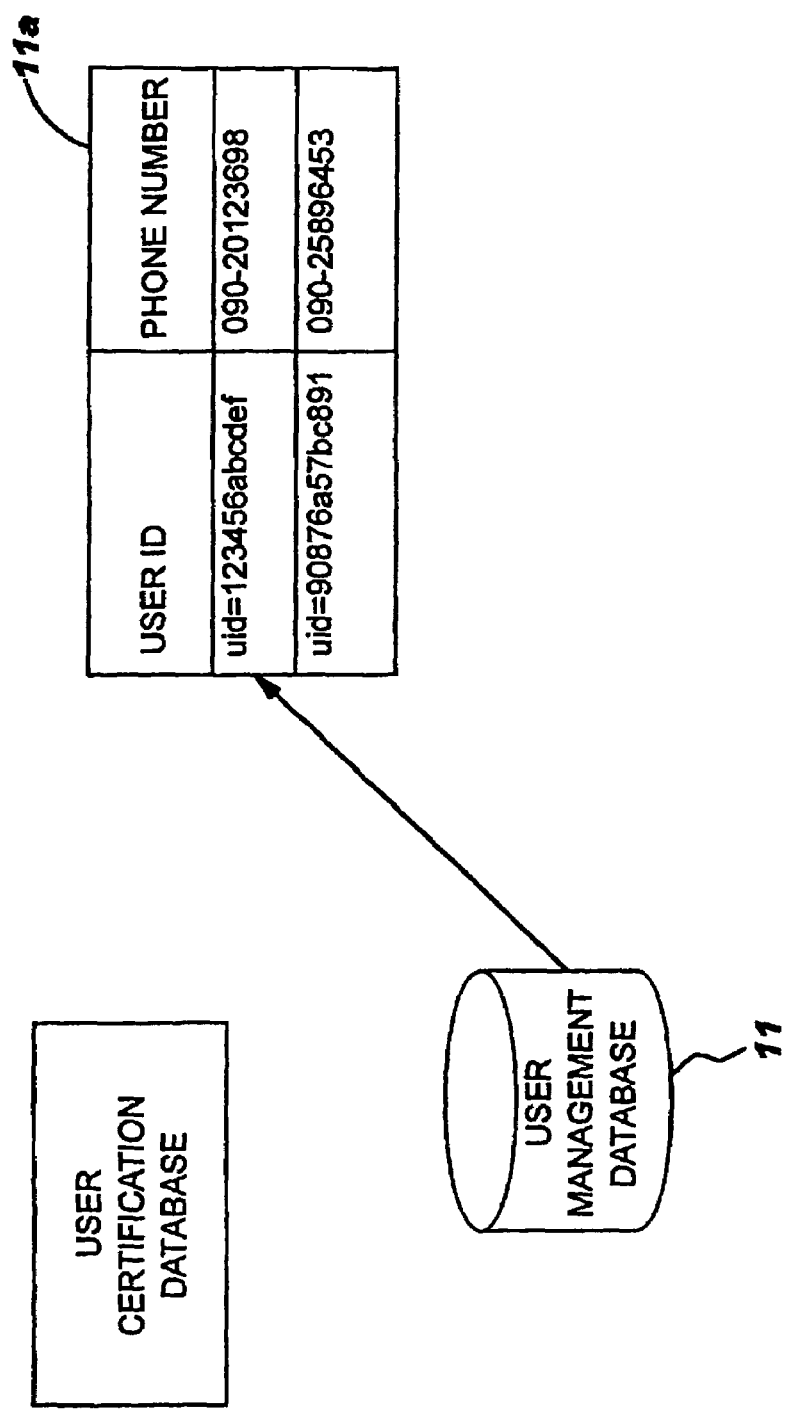
FIG. 5 is a data structure of a user certification database included in the carrier server of the present invention.

FIG. 5 shows a configuration of the user certification database 11 (FIG. 3). The user certification database 11 stores data class 11*a* comprising the user ID of user A of the cellular phone 1 that and the phone number of the cellular phone 1 that corresponds to the user ID, so that the cellular phone 1 used by user A can be certified from the phone number, etc. of the cellular phone 1.

FIG. 6 shows a configuration of the content pool database 12 of the database DB1 (FIG. 1) included in the carrier server 4. The content pool database 12 stores one data class 12*a* together with the identification information of the cellular phone 6 of the user B to be presented with content. The data class 12*a* comprises the phone number of each content receiver user, distribution management ID, distribution item, and distribution date/time. In the example shown in FIG. 6, a phone number is used as identification information, however, the present invention may also enable a user ID for identification information. The database 12 includes a NULL flag which can be set when the requested content is not provided due to a disabled connection. It is thus possible to decide whether or not the distribution has been completed. When the requested content has already been distributed, the actual delivery date/time is recorded in the content pool database 12. The present invention enables a simple binary flag to denote completion of the distribution.

Figure 7:
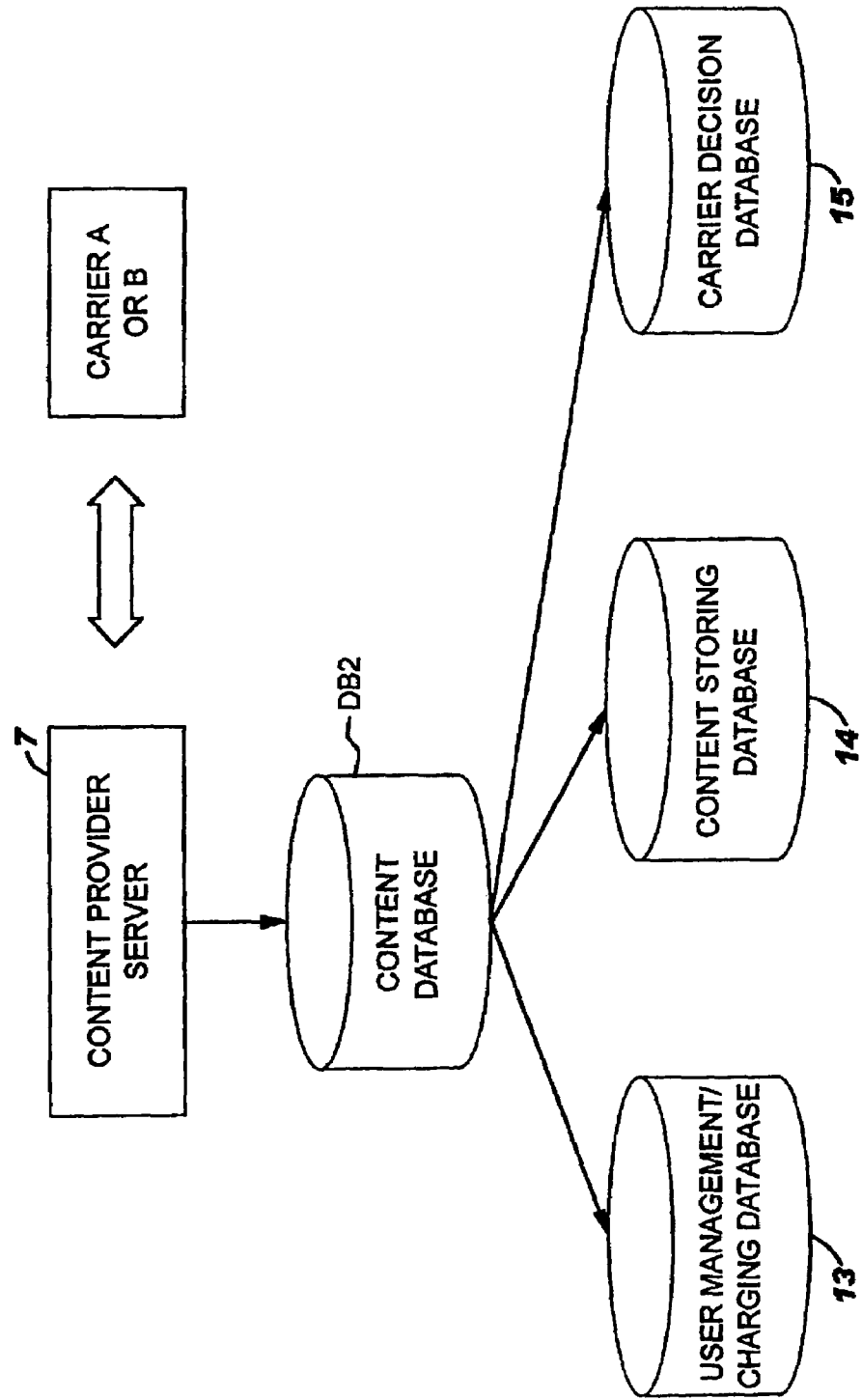
FIG. 7 is a data structure of a database included in a content provider server of the present invention.

FIG. 7 shows a data structure of the content database DB2 included in the content provider server 7 (see FIG. 2). The server 7 communicates with, for example, the carrier A or B shown in FIGS. 1 and 2 for necessary information in accordance with the condition of a predetermined network 2 connected to the cellular phone 1 that has issued a request for content presentation. For example, when the content requesting source cellular phone 1 belongs to the network of the carrier A and the content receiver cellular phone 6 belongs to the carrier A, the content provider server 7 only communicates with the carrier A to obtain charging information, user certification information, content item to be presented, and the required information about user B of the content receiver cellular phone 6.

However, in the case where the content receiver cellular phone 6 belongs to the network of another carrier such as the carrier B, the content provider server 7 receives the user certification information, the content item to be presented, and the required information about the user B of the cellular phone 6 from the carrier A. Then the server 7 searches the requested content and the identification information for cellular phone 6 in the database DB2 so as to send those searched items to the carrier B.

The content database DB2 shown in FIG. 7 is configured by a user management/charging database 13, a content storing database 14, and a carrier decision database 15. The user management/charging database 13 is used to store the charging information of the user A of the cellular phone 1 in accordance with the identification and issue charging information of the presented content. The content database 14 stores content to be presented, and the contents therein are searched according to each content presentation request. The carrier decision database 15 is used to determine the carrier of the content receiver cellular phone 6 and sends the requested content to the carrier A to which the cellular phone 6 belongs, and communicates with the carrier B for any necessary information.

FIG. 8 shows a configuration of the user management/charging database 13 included in the content database DB2. The database 13 stores a user table as one data class 13a comprising user ID, user name, carrier to which each user belongs, and carrier ID. For example, in the embodiment shown in FIG. 7, a user whose user ID is "1" has a user name "user a", belongs to the network of the carrier 1(xxxxxx), and has a carrier ID "uid=ABCDEF123456".

The user management/charging database 13 shown in FIG. 8 also has a data distribution table as a data class 13b comprising distribution ID, user ID, and destination information such as the phone number of each cellular phone, information about the carrier having a distribution address, ID of the content to be distributed, date/time of distribution to a carrier corresponding to the distribution address, and transaction ID. For example, when the distribution ID is "00001", the user ID of the content presentation request source cellular phone 1 is "1" and the phone number and carrier of the distribution address are "090-aaaa-bbbb" and "1(xxxxxx). The content ID of the distributed content is "1", the content is distributed on "2000.08.23.00.0000", and the transaction ID is "il287969".

The user management/charging database 13 shown in FIG. 8 also has a charging table as a data class 13c comprising a charging ID, distribution ID, user ID of the cellular phone 1 which is to be charged, price, price collection (YES/NO) state, and transaction ID at the distribution time. As described above, the use of the charging table 13c makes it possible to correctly charge the cellular phone 1 that requested the content presentation.

Figure 9:
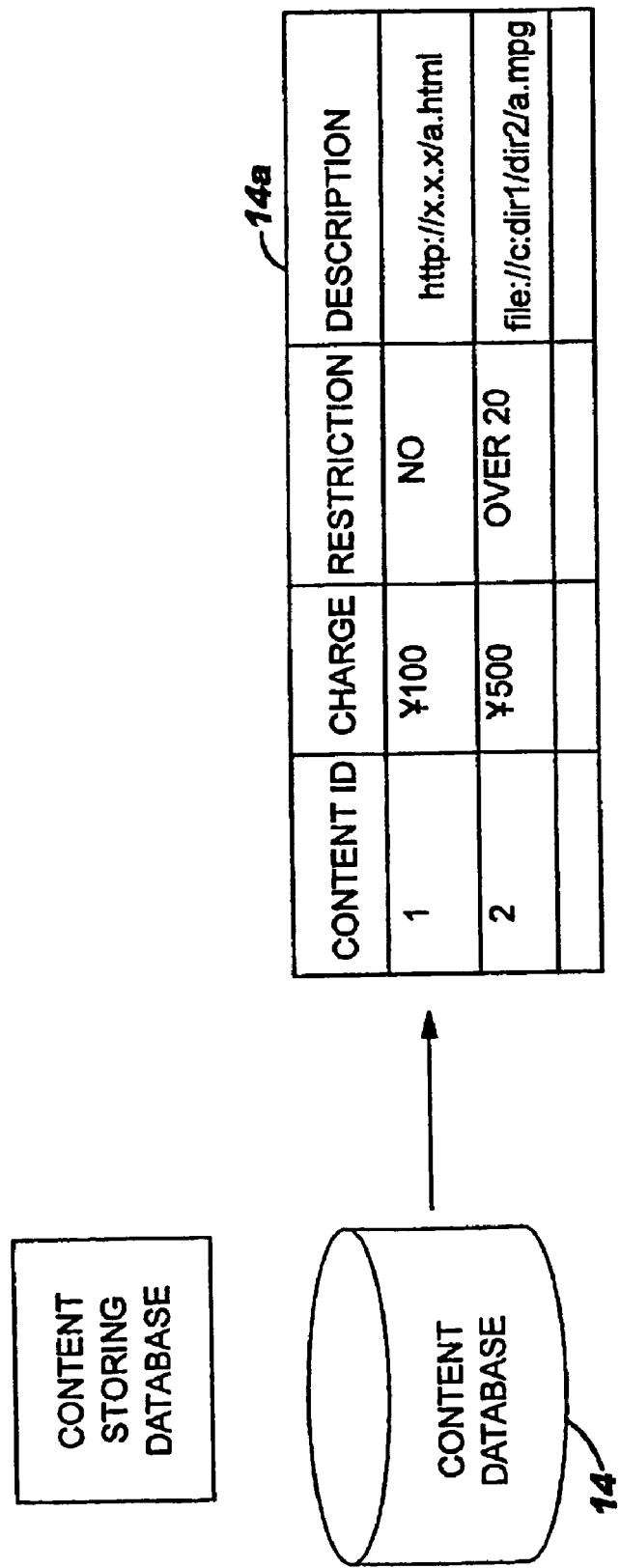
FIG. 9 is a data structure of a content storing database of the database included in the content provider server of the present invention.

FIG. 9 shows a data structure of the content storing database 14 included in the content database DB2. The content storing database 14 has a data class 14a table comprising content ID, price, restriction for each content, and a linked URL address (http://x.x.x/a.html) or file address (file://e:dir1/dir2/a/mpg) used to identify each content. The content storing database 14 configured in such a way makes it possible to identify each content requested by the user of the cellular phone 1 and to send the identified content to the carrier that includes the network of the cellular phone 6 of the user B who is to be presented with the content.

Figure 10:
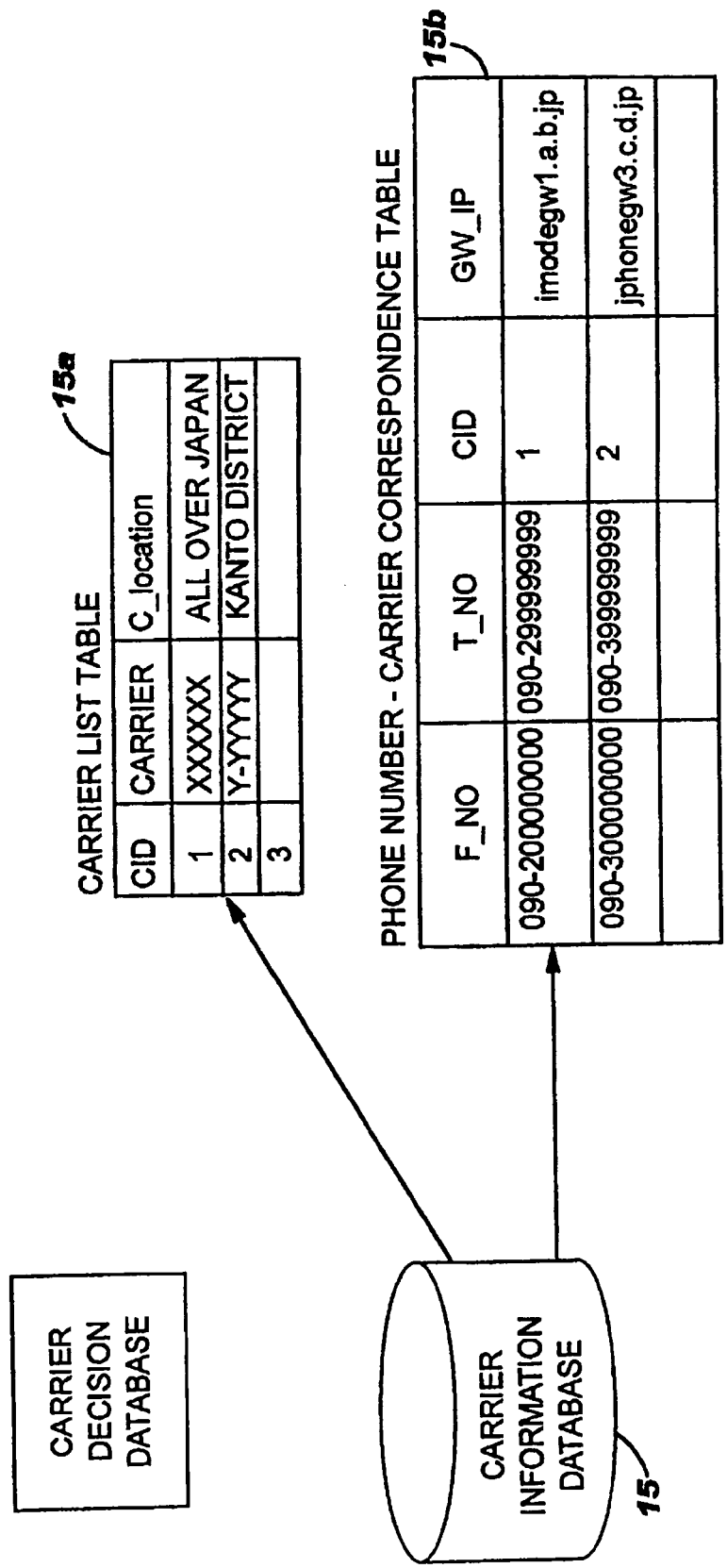
FIG. 10 is a data structure of a carrier type decision database of the database included in the content provider server of the present invention.

FIG. 10 shows a data structure of the carrier decision database 15 included in the content database DB2. The carrier decision database 15 shown in FIG. 10 has a carrier list table as a data class 15a. The table lists operational carriers. In addition, the carrier decision database 15 has a data class 15b table for correspondence between phone numbers and carriers. The data class 15b comprises a first digit (F_No.) and a last digit (T_No.) of each phone number assigned to each carrier, a CID (carrier ID), and an IP address for the carrier gateway with respect to the content presentation cellular phone 6.

The carrier list table 15a stores the name xxxxxx of each carrier corresponding to each carrier ID, and service available range C_location of the carrier, for example, all over Japan or Kanto District. The use of the table 15b makes it possible for the content provider server 7 to identify, for example, the carrier B that holds the phone number of the cellular phone 6 specified to receive content and send the content to the GW_IP of the carrier B, thereby cellular phone 6 receives the content.

Figure 11:
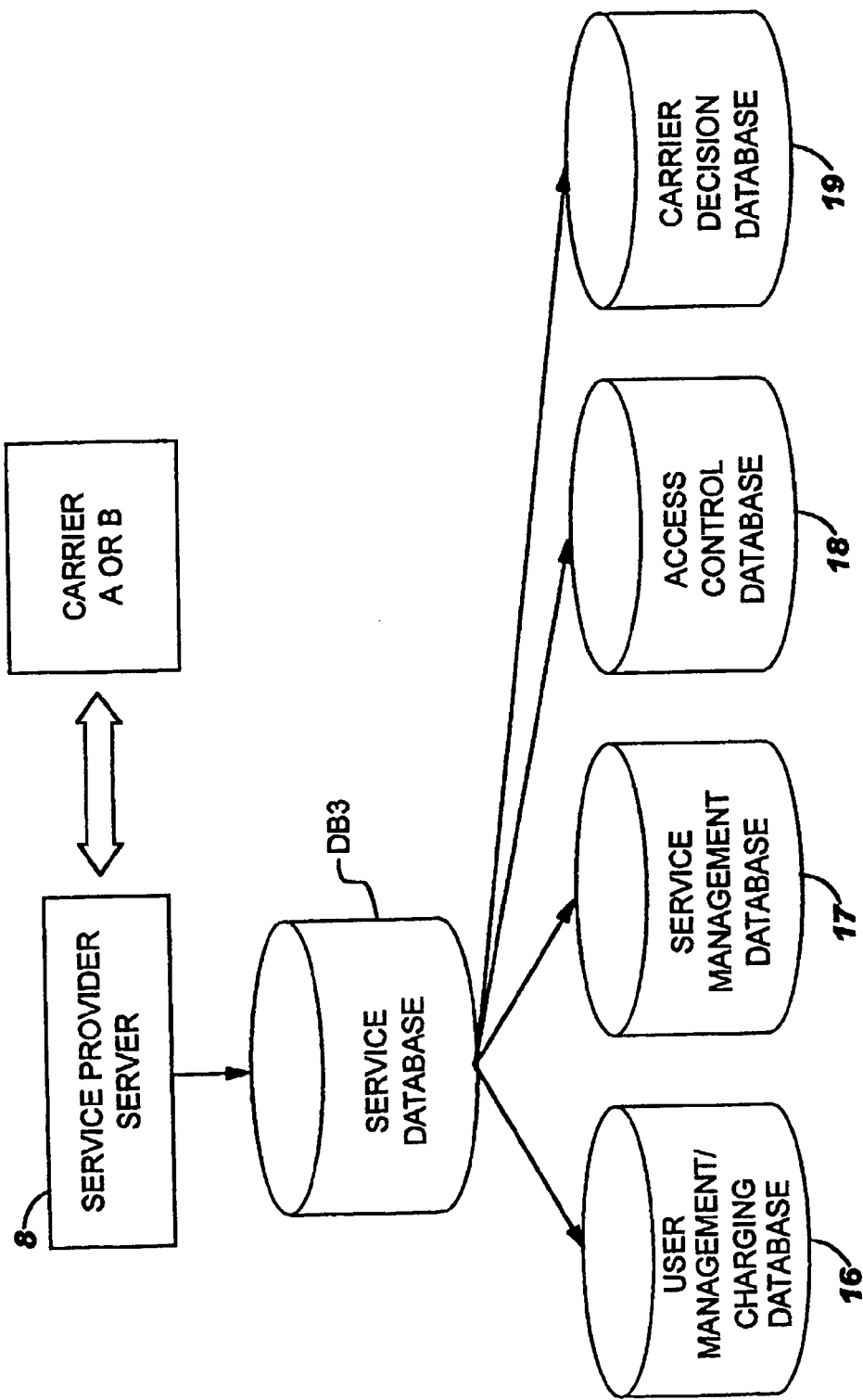
FIG. 11 is a data structure of the database included in the content provider server of the present invention.

FIG. 11 shows a configuration of the service database DB3 included in the service provider server 8 of the present invention. The service provider server 8 and the content provider server 7 may be installed at different sites or at the same site. The service provider server 8 sets a required access privilege for a predetermined service according to a service presentation request, for example, only for a certain period. Receiving content that includes service use permitting information, the user of the cellular phone 6 uses the access privilege set by the service provider server 8 to access the object site. Thus, the user A of the service presentation request source cellular phone 1 is charged for the presented content. Therefore, the user A of the content presentation request source cellular phone 1 is enabled to present user B with an access privilege for a service.

The service database DB3 included in the service provider server 8 is configured by a user management/charging database 16, a service management database 17, an access control database 18, and a carrier decision database 19. The user management/charging database 16 and the carrier decision database 19 are configured in the same fashion as the user management/charging database 13 and the carrier decision database 15, respectively, of the content database DB2 of FIG. 7.

Figure 12:
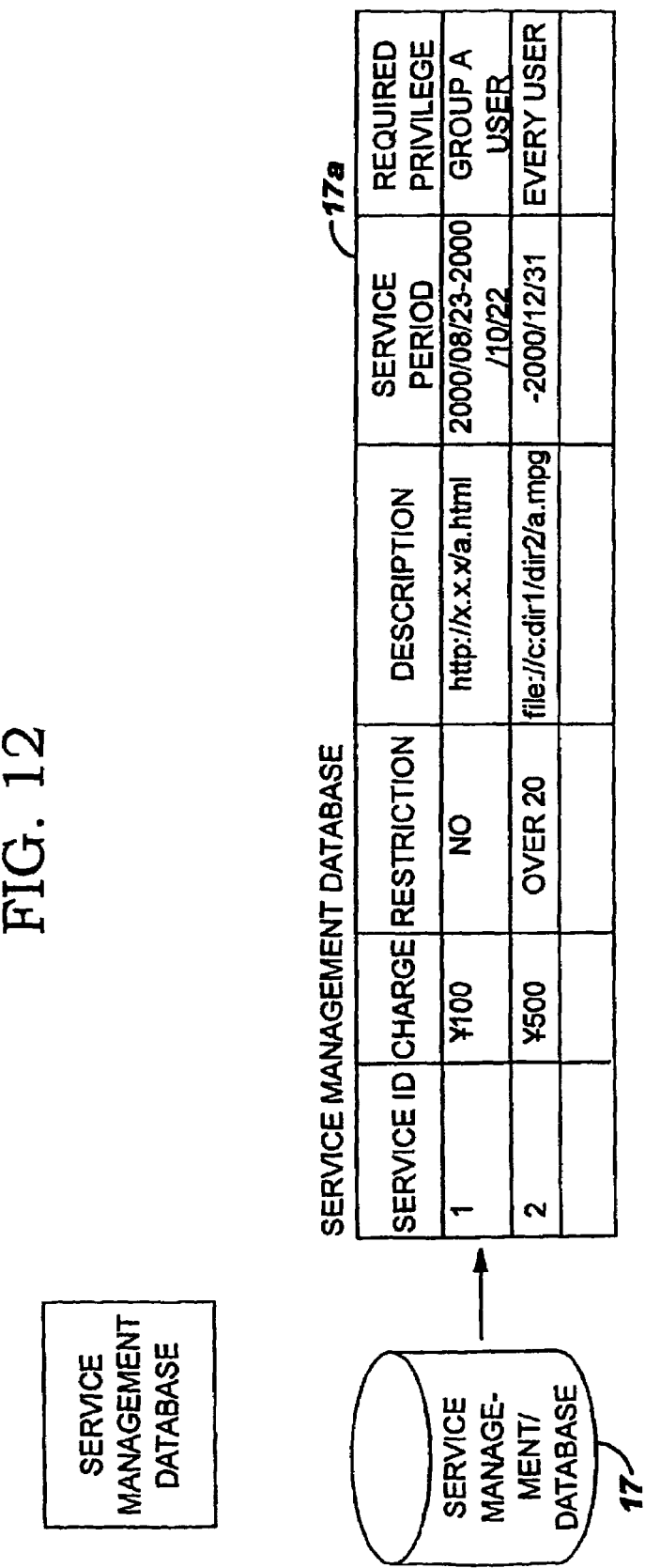
FIG. 12 is a data structure of a service management database of the database included in the service provider server of the present invention.

FIG. 12 shows a data structure of the service management database 17 included in the service database DB3 of FIG. 11. The service management database 17 includes a data class 17a comprising for example, a service_ID (a serial number for identifying a service content), a price for the service/content, restriction, file name or linked URL address to identify the service/content, service/content availability period, and whatever privilege is required for receiving the service/content. Database 17 is used to hold and manage the services that are to be provided.

Figure 13:
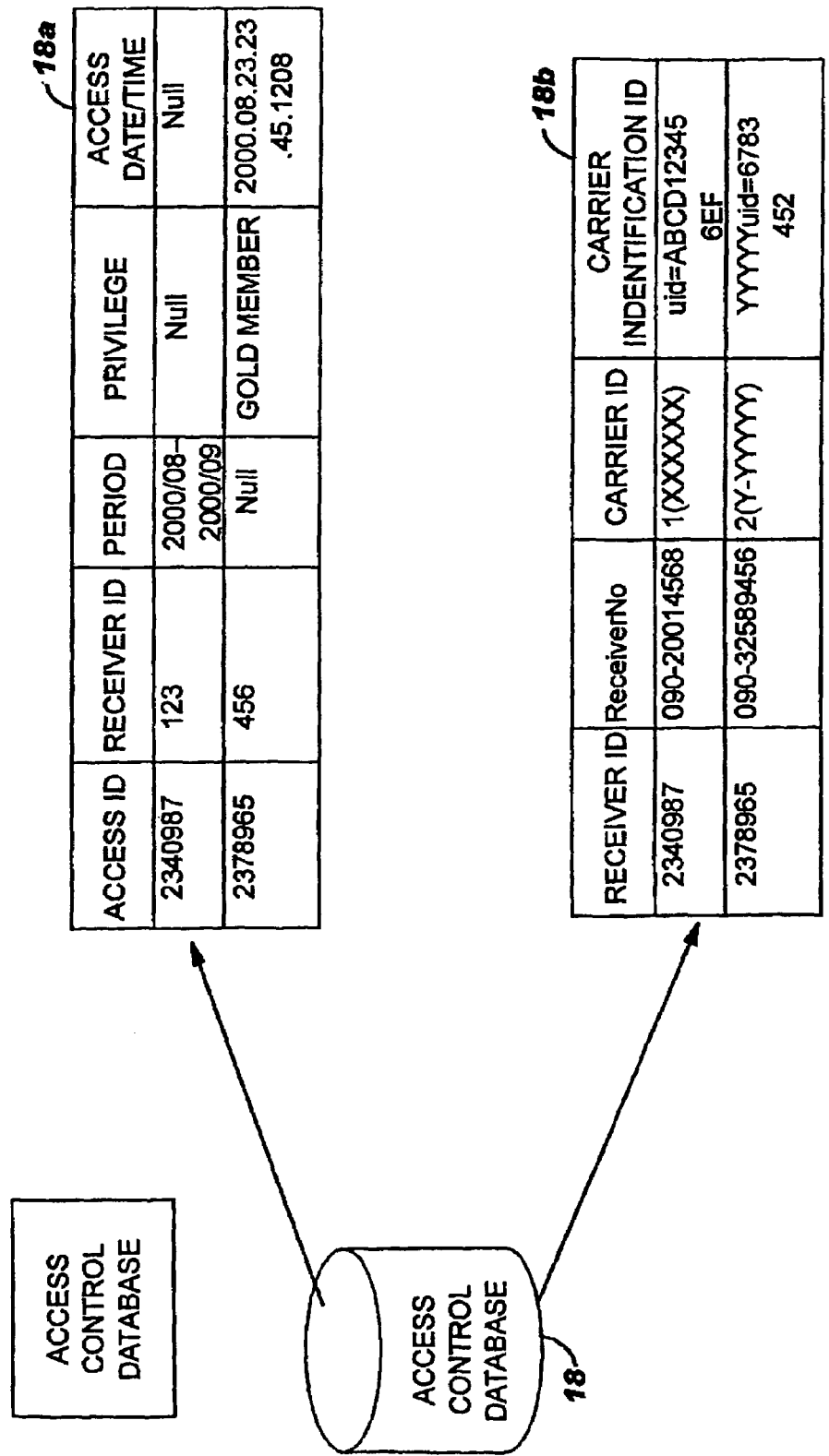
FIG. 13 is a data structure of an access control database of a database included in the service provider server of the present invention.

FIG. 13 shows a structure of the access control database 18 included in the service database DB3 of FIG. 11. The access control database 18 includes a data class 18a comprising, for example, an access management number access ID, a receiver ID to identify the cellular phone 6 of the user to be presented with an access privilege, an access privilege available period, a presence of access privilege, and a date/time indicating when the service was accessed. The user B of the cellular phone 6 (access ID "2340987") has requested an access privilege for a period between August and September 2000, but the user B is not allowed access due to a restriction item set for the access privilege. The user privilege has been kept as NULL, so that the user B is disabled for access. The user B is denied access privileges for a limited period. The present invention, however, may restrict the access privilege to limit the item to be accessed.

Furthermore, the user B of the cellular phone 6 with an access ID of "2378965" is a gold member and presented with limitless access privileges. The record indicates that the user B has accessed at least at "23: 45: 1208 on Aug. 23, 2000. The present invention may also monitor user B's total access time in order to charge user A.

The database 18 also includes a data class 18b comprising for example a receiver ID of the cellular phone 6, a receiver number (identification information such as a phone number), a carrier ID to identify the carrier corresponding to the receiver number, and a carrier identification ID assigned to the user B by the carrier. The access control database 18 thus configured enables the user B of the cellular phone 6 to access an identified service with an access ID=2378965 after the receiver ID=456 is identified by the carrier identification ID.

Figure 14:
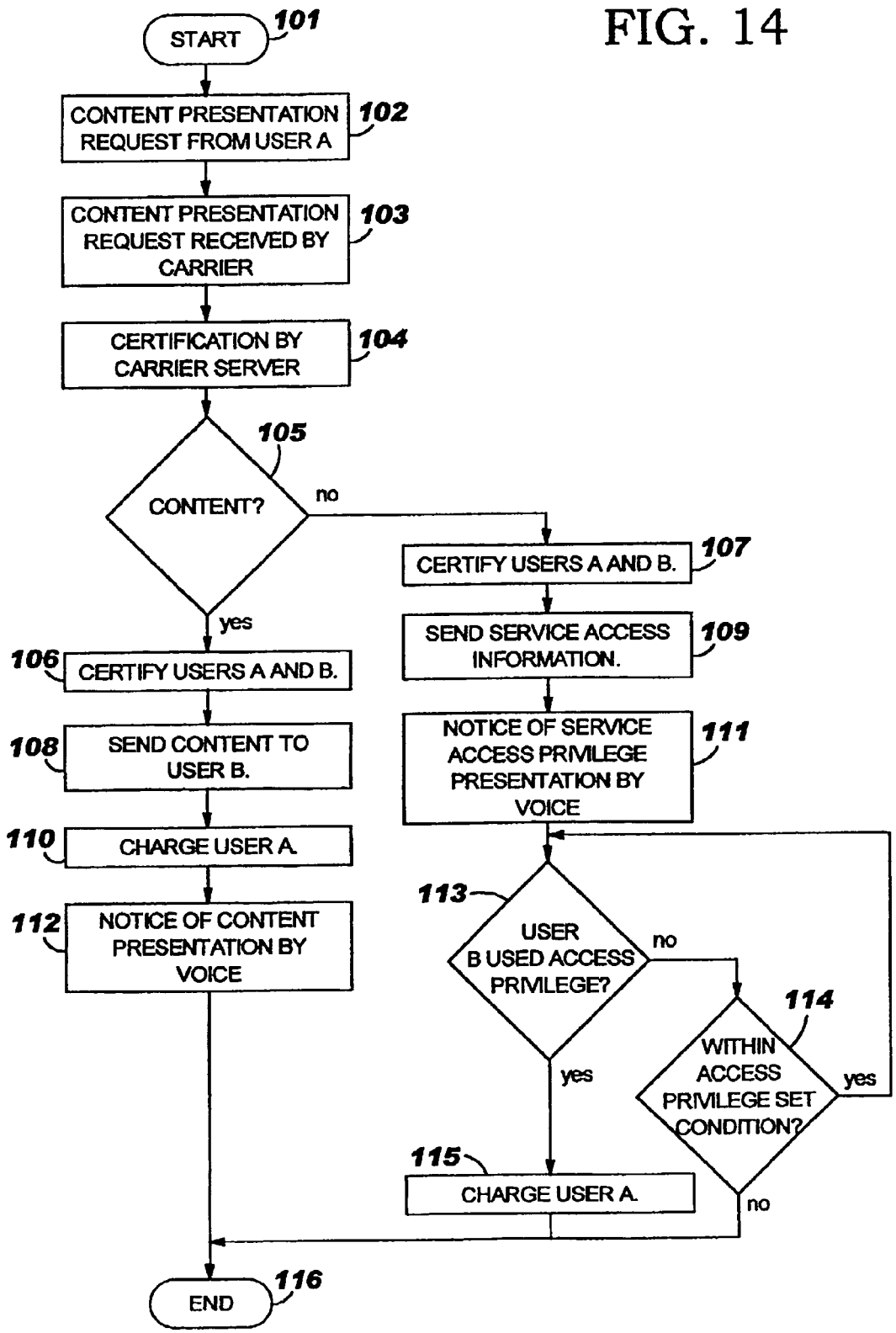
FIG. 14 is a schematic flowchart of a content presentation method of the present invention.

FIG. 14 shows a schematic flowchart of the process executed by the present invention. The process starts in step 101. The user A of the cellular phone 1 then issues a content presentation request which includes information about a desired service in step 102. The content presentation request is received by the carrier A via the network 2 (see FIGS. 1 and 2) of the carrier A in step 103. The user A is then certified by the carrier server 4 in step 104 using the personal certification function registered in the cellular phone 1. The carrier server 4 then issues a content presentation request to the content provider server 7 or service provider server 8 in step 105. The content presentation request includes service use permitting information.

After receiving the content presentation request, the content provider server 7 or service provider server 8 certifies the users A and B in step 106 or 107, respectively. The requested content is sent to user B's carrier or a notice is sent that a service access privilege has been set in step 109. At this time, the service provider server 8 has already set the access privilege to a predetermined service for the user B according to the service use permitting information. When the requested content is not the service use permitting information, the content providing server 7 or service providing server 8 sends the content to the users carrier in step 110. The charging information is sent to the carrier that has received the content presentation request from the user A. The carrier server 4 thus charges the user A. Then, in step 112, the carrier notifies user B of the presented vocal content by a call from a voice processor or an e-mail that audibly announces its arrival.

When the content presentation request is service use permitting information, the carrier server 4 of the carrier B communicates a service access privilege to the cellular phone 6 of the user B by call from the voice processor or an e-mail or both in step 111. When the user B accesses the service (YES) in step 113, the service provider server 8 sends charging information to the carrier to which the user A belongs in step 115. User A is thus charged for the service. Whether or not the user B makes an access is monitored in step 114 on the condition set for the presented access privilege, for example, a period, an accessing item, etc. The carrier server 4 may be set to not charge the user A when the access privilege is not used within the set access condition range.

The content provider server 7 and the service provider server 8 send requested content to be presented or service use permitting information to the user B who is the receiver and the charging information to the carrier of user A. Thus the content/service presentation of the user A is enabled. The present invention also enables both user A and B to belong to the same carrier.

Figure 15:
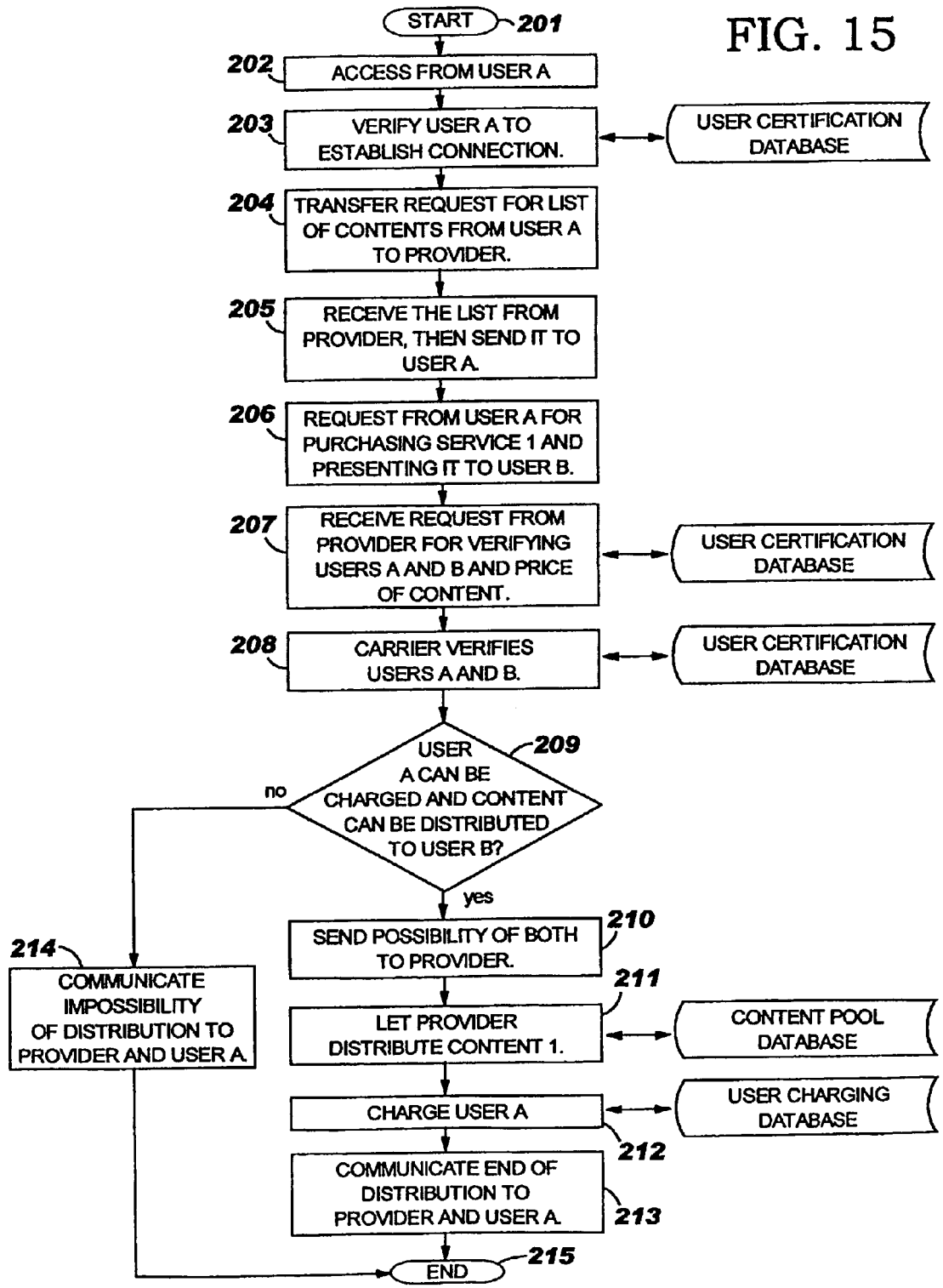
FIG. 15 is a carrier server process executed with use of the content presentation method of the present invention.

FIG. 15 is a flowchart illustrating execution of a process by the carrier server 4 to present content (not service use permitting information) between users A and B. The carrier server 4 as described in FIG. 15 is the same carrier server for the users A and B as they use the same carrier. When the users A and B use different carriers, each carrier server 4 includes a process to be executed by either of them.

The content presentation is started in step 201. In step 202, the carrier server 4 receives a request for a list of contents denoting that the user A wants to make presentation of a content, for example, from the cellular phone 1. At this time, for example, the cellular phone 1 can use a packet communication method to send the list of contents to the gateway of the carrier A.

The carrier A certifies the user A with reference to the database 11 in step 203 to establish the connection. The carrier server 4 then sends a content list request to the content provider server 7 in step 204 and executes a predetermined certification process. The content provider server 7 then sends the content list request to the user A via the network 2 in step 205.

The carrier server 4 then receives a content presentation request from the user A in step 206. The request has identified the user B. The carrier server 4 then sends this request to the content provider server 7. The content provider server 7 thus certifies the user with reference to the user management/charging database 13. Then the carrier server 4 receives a request for verification of user A and B and the price information of the content 1 in step 207. The carrier server 4 certifies the user A or the user B when the user B belongs to the same carrier as user A with reference to the user certification database 11 in step 208. Preferably certification is done with specific user ID assigned by the carrier to the cellular phone 1. The user A does not need to make another service contract to obtain another user ID and another password; as the sophisticated personal identification function of the cellular phone 1 can be used effectively.

In step 209, the carrier server 4 decides whether or not it is possible to charge the user A and provide the user B with content. When it is possible to charge the user A and present the user B with content (YES), the carrier server 4 communicates with the content provider server 7 in step 210 that both are enabled.

Then, the carrier server 4 receives content from the content provider server 7 in step 211 and transfers the content to the user B. At this time, the carrier server 4 notifies user B of the arrival of content by a call from a voice processing system or as an arrival sound of an e-mail. When the carrier server 4 cannot provide content to the user B immediately, the carrier server 4 stores the content in the content pool database 12 until the communication is enabled. Passing the content to user B, the carrier server 4 processes a charge for user A with reference to the user management/charging database 10 in step 212. The end of the distribution to both the content provider server 7 and the user A is communicated in step 213. This completes the carrier server process in step 214.

When the decision result to decision block 209 is NO (it is not possible to charge the user A nor provide the requested content to user B, or both), the carrier server 4 communicates the impossibility to both the content provider server 7 and the user A, thereby the carrier server process is terminated.

Figure 16:
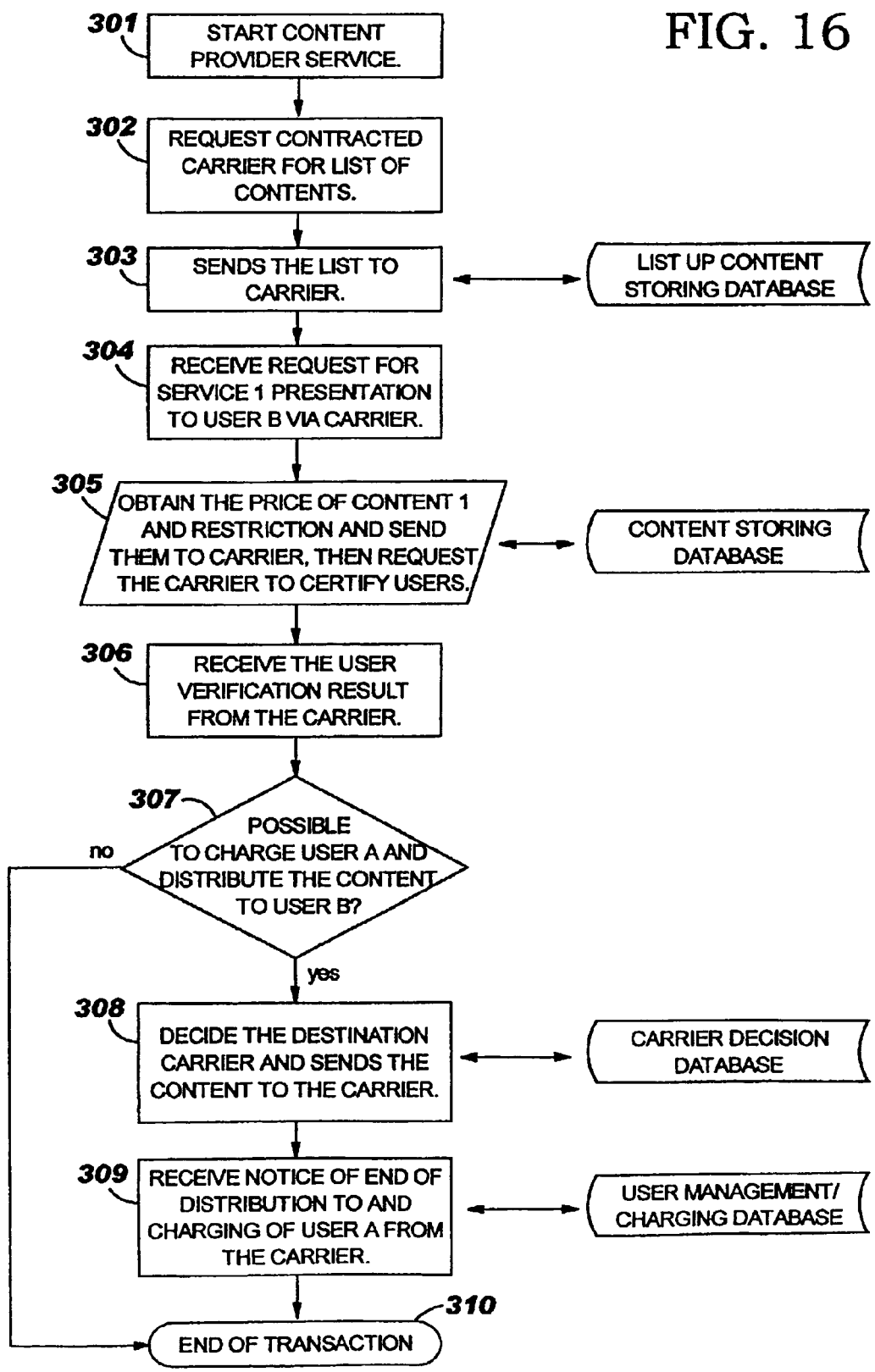
FIG. 16 is a content provider server process executed with use of the content presentation method of the present invention.

FIG. 16 is a flowchart illustrating execution of a process by the content provider server 7 to present a user with content. The content provider server 7 starts a service in step 301. Then, the content provider server 7 receives a content list request from a predetermined contracted carrier in step 302. Illegal accesses can be prevented by using a user ID and a password, preset respectively, when a contract is made between the carrier and the content provider. In the present invention, however, because personal certification information of the user A is already held in the carrier, a new contact is only done between the carrier and the content provider. There is no need for the user A to make a contract personally with the content provider. This is why it is possible to speed provision of content and improve the usability of the content presentation system.

The content provider server 7 sends a list of contents to the carrier server 4 in step 303. The carrier server 4 then transfers this list of content to the user A. The content provider server 7 receives a request that the user A presents the content 1 to the user B via the carrier in step 304. In step 305, the content provider server 7 obtains both the price and the restriction of the content 1 by searching the content storing database 14. The content provider server 7 then sends the list of content to the carrier. At the same time, the content provider server 7 requests the carrier server for certification of the users A and B. In step 306, the content provider server 7 receives the result of the verification of the users A and B from the carrier server 4. In step 307, the content provider server 7 decides whether or not the users A and B are ready to receive the content. When the decision is YES (they are ready), in step 308 the content provider server 7 searches for the destination carrier in the carrier decision database 15, decides upon the carrier, and then sends the content to user B's carrier. When the decision result in step 307 is NO (either or both of them are not ready yet), the content provider server 7 goes to step 310 and terminates the transaction.

In step 309, the content provider server 7 receives a notice upon completion of the content providing, and then a notice upon completion of the charging for the user A from the carrier server 4. The content provider server 7 terminates the transaction in step 310. Alternatively, when user A and user B belong to different carriers, a notice may be received upon completion of the content providing after the user B receives the content, and then a charging command may be sent to the carrier server 4 to which the user A belongs, and then the transaction is terminated in step 310 after completion of charging from the carrier server 4 to which the user A belongs.

Figure 17:
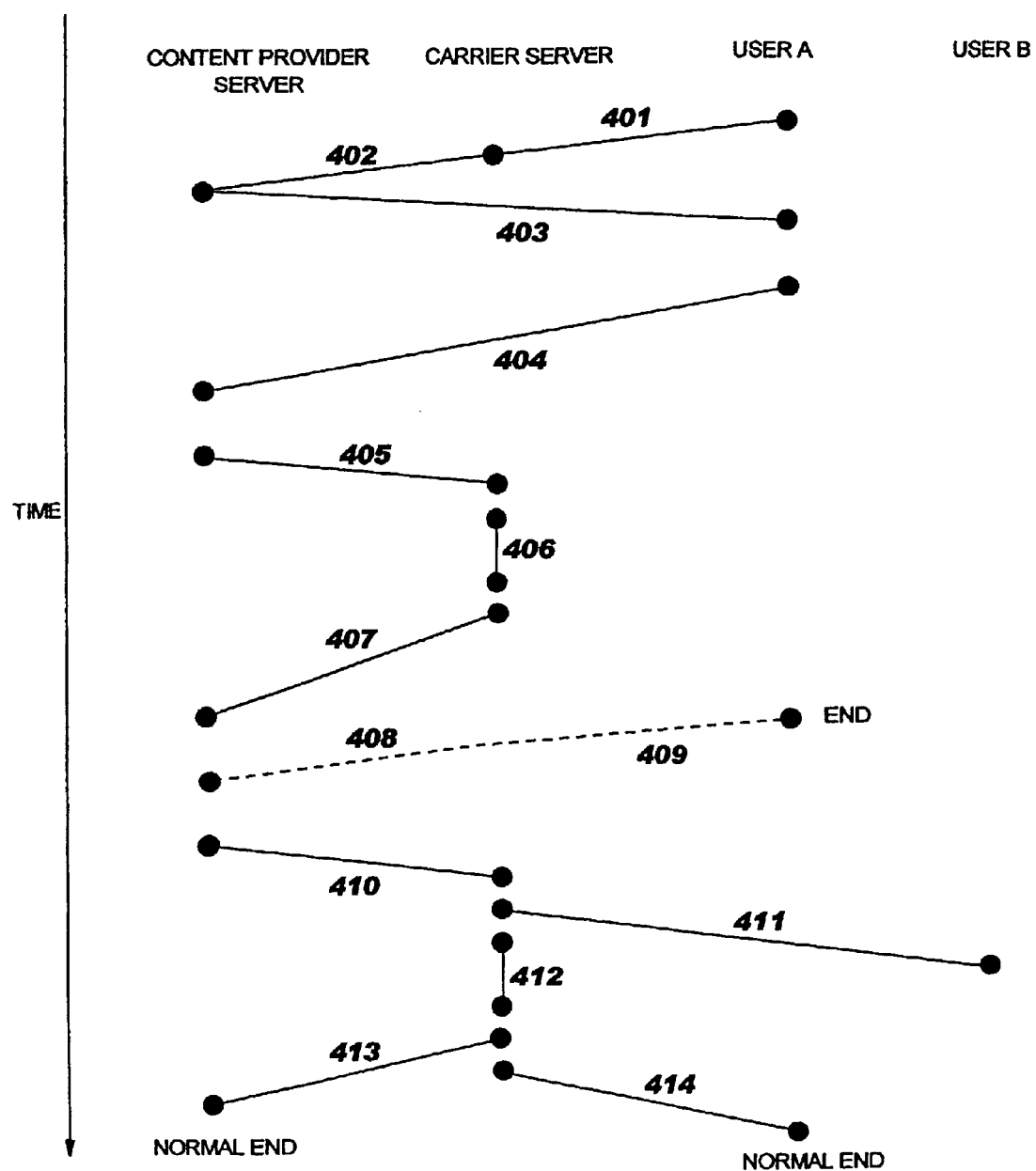
FIG. 17 is a time-series process executed with use of the content presentation method of the present invention.

FIG. 17 shows a time-series process executed by the content provider server 7 so that user A presents user B with content (other than service use permitting information), On the line 401, user A is connected to and certified by the carrier server 4. On the line 402, the certified user A is connected to the content provider server 7 to request a list of available content.

On the line 403, the content provider server 7 returns the list of available content to user A via the carrier. On the line 404, user A sends a product number of the content to be purchased to the content provider server 7 via the carrier. On the line 405, the content provider server 7 sends information about the user B (the purchaser and presenter), as well as the charged price to the carrier server 4. On the line 406, the carrier server 4 checks whether or not user A can be charged for the content and if the content can be distributed to user B. When both check results are OK, the carrier server 4 communicates a predetermined price the content provider server 7 on the line 407.

On the line 408, when either the charging or the distribution is impossible, the carrier server 4 communicates with the content provider about the impossibility, and the transaction at the content provider side is terminated. Then, on the line 409, the carrier notifies user A that the content presentation request cannot be executed. The user side transaction is thus terminated on line 409. Then, on the line 410, the content provider sends the content to the carrier. On the line 411, the carrier server 4 notifies user B of the content presented from the user A with a voice processing system or an e-mail.

On the line 412, the carrier server 4 charges the user A. On the line 413, the carrier server 4 communicates the normal termination of the charging/presentation to the content provider server 7, and the content provider side transaction is terminated. On the line 414, the carrier server 4 notifies user A of the arrival of an e-mail by a voice call from a voice processing system or an e-mail that produces a notification sound upon arrival. User A can thus know of the termination of both presentation and charging. The user A side transaction is terminated on line 414.

Figure 18:
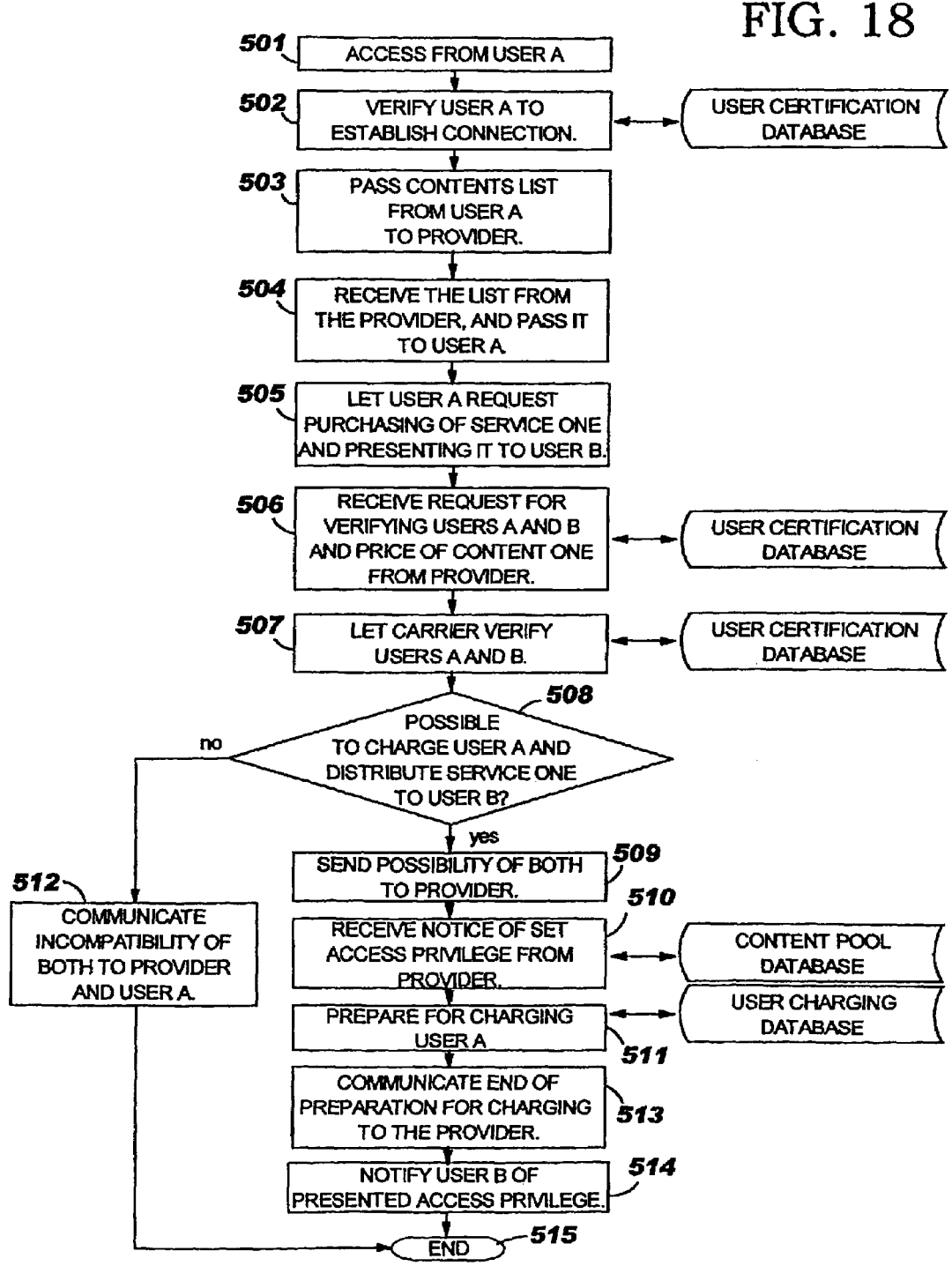
FIG. 18 is a flowchart for user certification and access privilege setting in a carrier server process executed with use of the service presentation method of the present invention.

FIG. 18 shows the execution of a carrier server process that presents a user with access privilege to services (hereinafter, to be referred to as at a service presentation time). The carrier server process at a service presentation time is started at step 501 when the carrier server 4 receives a service presentation request from user A who wants to present a service to user B. In step 502, the carrier server 4 certifies the user A with reference to the user certification database 10 to establish the connection to user A. In step 503, the carrier server 4 sends a service list request to the content provider server 7. The service list request is issued from user A. In step 504, the carrier server 4 receives the service list from the content provider server 7 and sends it to user A.

In step 505, the carrier server 4 receives requests from user A; one for purchasing service one selected from the service list and the other for presenting the service one to user B. The carrier server 4 then passes the two requests to the service provider server 8. In step 506, the carrier server 4 receives a request to verify users A and B, and a price for the service one from the content provider server 7 with reference to the user management/charging database 16. A single carrier server 4 executes the process in step 506 when both user A and user B belong to the network of the same carrier. If user A and user B belong to different carriers, both carrier servers execute the processing in step 506, respectively. In step 507, the carrier server 4 certifies both user A and user B.

In step 508, the carrier server 4 decides whether or not user A can be charged and if a privilege can be presented to user B. When the decision result is YES, the carrier server 4 goes to step 509 to communicate the possibility of service presentation to the service provider. Upon receipt, the service provider server 8 executes a server process (to be described later), then communicates with the carrier server 4 to which user A belongs about the privilege set for user B so as to receive the service in step 510. The carrier server 4 prepares to charge user A by searching necessary information in the user management/charging database 16 in step 511. When the decision result is NO in step 508, the carrier server 4 communicates the impossibility of the presentation to both the service provider server 8 and user A in step 512. The carrier server process is then terminated at 515.

The carrier server 4 sends a notice that it is ready to charge the user A in step 513. The service provider server 8 communicates a privilege presented from user A to the carrier server 4 of user B (users A and B belong to different carriers). In step 514, the carrier server 4 to which the user B belongs notifies user B of the privilege presentation from user A. This notification is to the carrier server 4 to which user B belongs when users A and B belong to different carriers. The carrier server process at a service presentation time is terminated in step 515.

Figure 19:
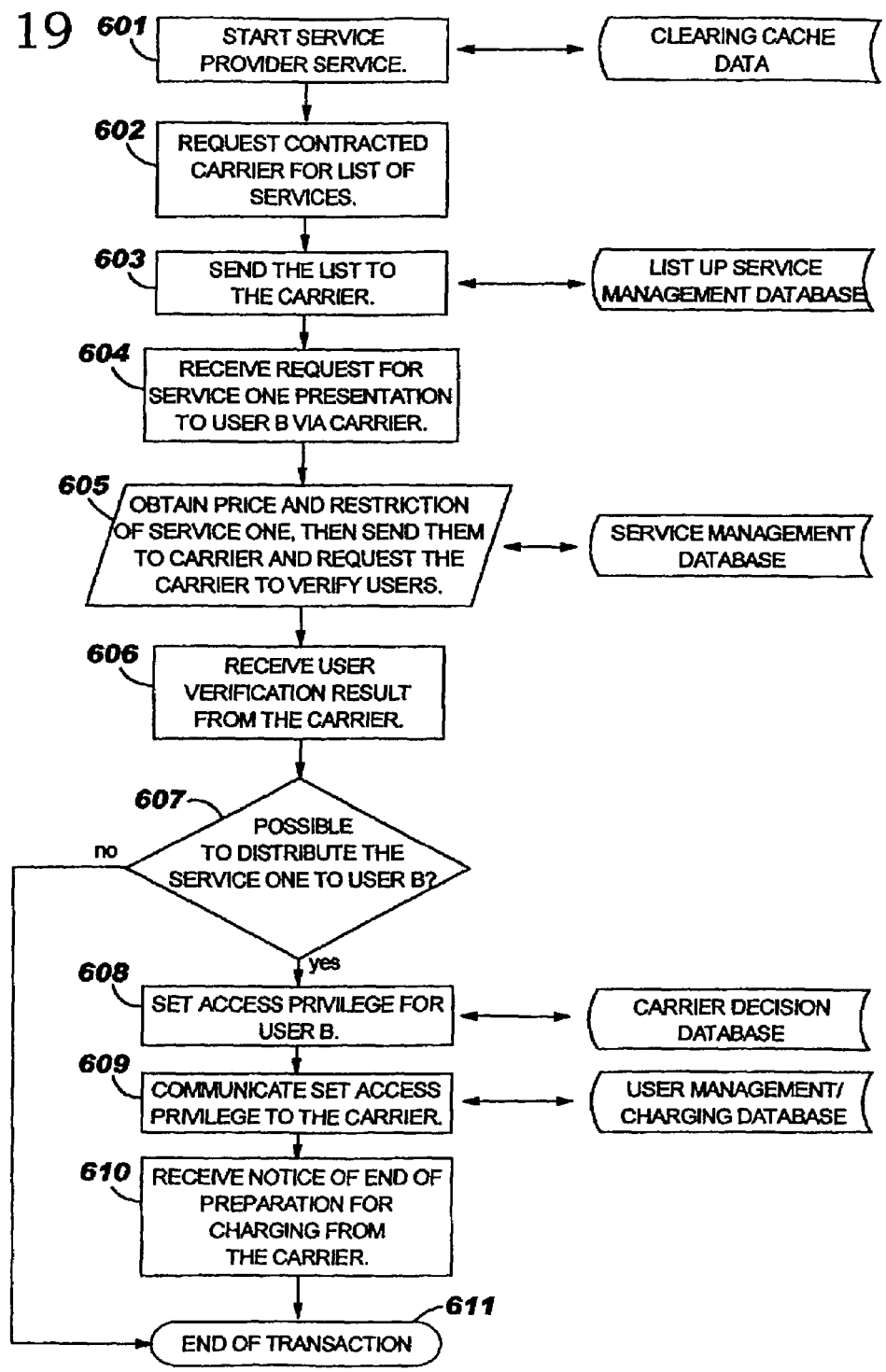
FIG. 19 is a flowchart for user certification and access privilege setting in a provider server process with use of the service presentation method of the present invention.

FIG. 19 shows a flowchart of a server process executed by the service provider server 8 to certify users and set a privilege at a service presentation time. The service provider process starts in step 601 to clear the data stored in a cache. In step 602, the service provider server 8 receives a service list request from the carrier server 4 of the contracted carrier. Illegal accesses between the contracted carrier and the service provider server 8 can be prevented by use of a predetermined user ID and password. In step 603, the service provider server 8 sends the service list to the carrier server 4. In step 604, the service provider server 8 receives a request from user A via the carrier server 4 to present user B with a privilege for receiving the service one.

The service provider server 8 then obtains the price and restriction items of service one from the service management database 17. Server 8 sends the price and restriction to the carrier server 4 in step 605 to request certification of users A and B. When both of user A and B belong to different carriers, the service provider server 8 requests each of those carriers to certify the user A and B, respectively. In step 606, the service provider server 8 receives the result of the certification from the carrier server 4.

In step 607, the service provider server 8 decides whether or not a requested service can be presented to the user B. When the decision result is NO, the server process is terminated in step 611. When the decision result is YES in step 607, the service provider server 8 sets an access privilege for user B as to enable access to the access control database 18. In step 609, the service provider server 8 communicates the access privilege, which is already set for user B, to the carrier server 4 to which the user B belongs. In step 610, the service provider server 8 receives notice from the carrier server 4 of the completed preparation to charge the user A. The server process is then terminated in step 611.

Figure 20:
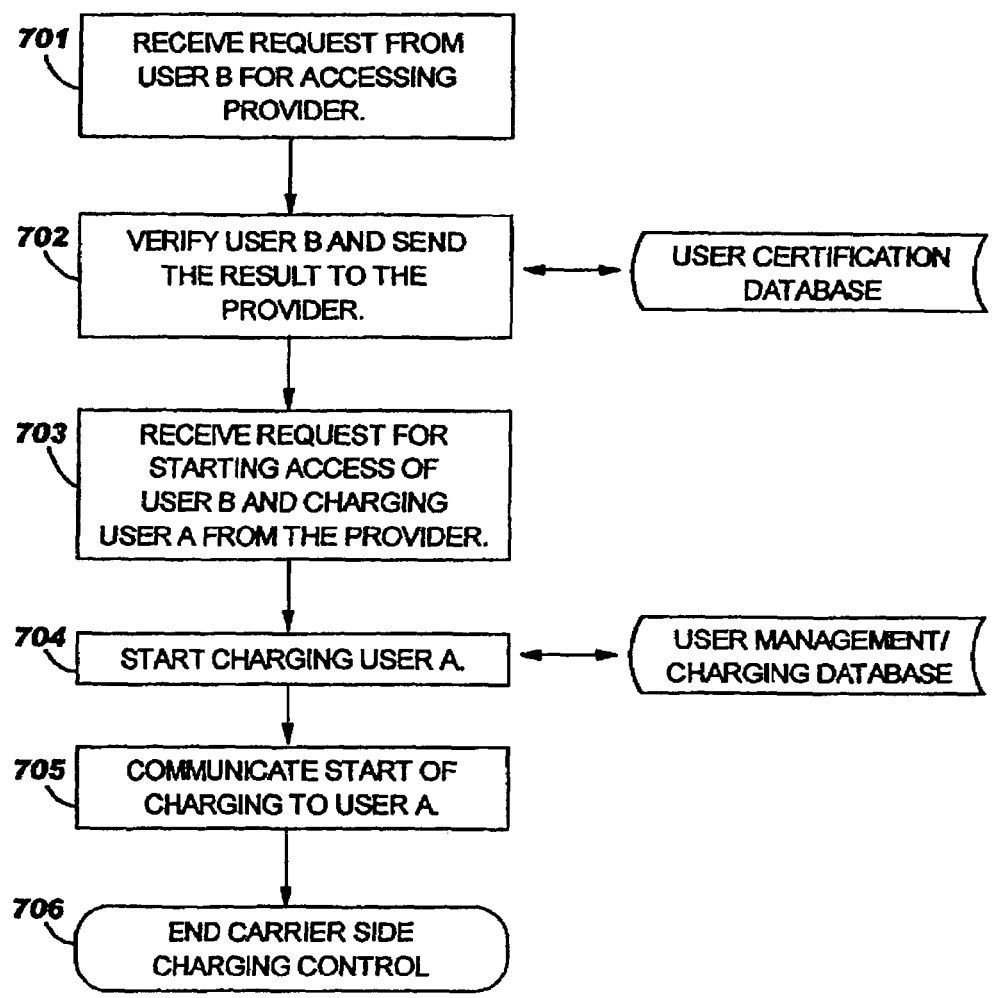
FIG. 20 is a flowchart for an access in a carrier server process executed with use of the service presentation method of the present invention.

FIG. 20 shows a flowchart of an access by user B in a server process executed by the carrier server 4 at a service presentation time. The server process starts in step 701, when the carrier server 4 receives a request from user B to access the service provider server 8. The carrier server 4 certifies user B by searching for necessary information in the user certification database 10 in step 702, and then sends the information of the user B to the service provider server 8. The carrier server 4 to which user A belongs is requested by the service provider server 8 to enable user B to start access and to start charging user A. The carrier server 4 starts charging user A in step 704 with reference to the user charging database 10.

The carrier server 4 notifies user A of the charging in step 705. The series of processings in the carrier side process are thus completed. As described above, charging user A is started when the requested content is sent to user B if the content to be presented does not include service use permitting information. However, when user B is presented with a service access privilege, no charge occurs as long as the presented access privilege is not used.

Figure 21:
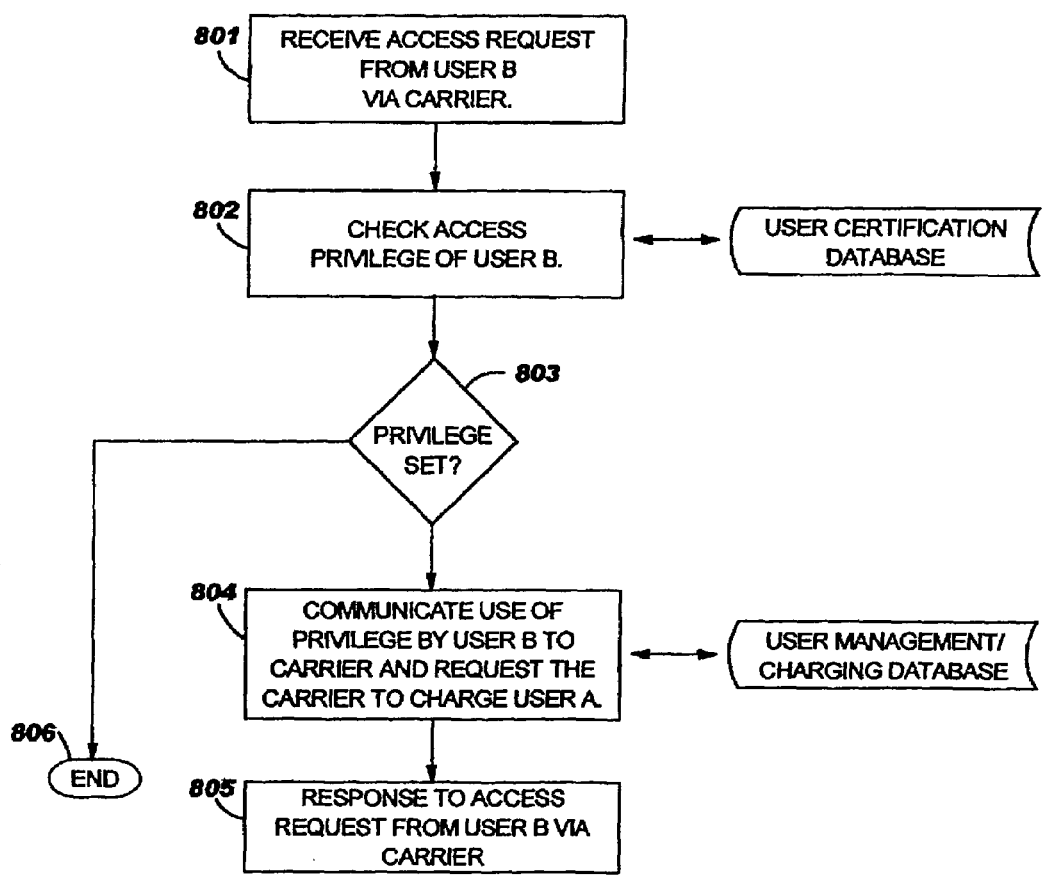
FIG. 21 is a flowchart for an access in a provider server process executed with use of the service presentation method of the present invention.

FIG. 21 illustrates an access of user B in a server process executed by the service provider server 8 at a service presentation time. At first, the service provider server 8 receives an access request from user B via the carrier to which user B belongs in step 801. In step 802, the service provider server 8 certifies user B for the access privilege by searching necessary information in the access control database 18. After this, the service provider server 8 decides whether or not user B is authorized for access in step 803. When the decision result is NO, the service provider server 8 terminates the process in step 806.

When the decision result at step 803 is YES, the service provider server 8 communicates use of the presented privilege by user B to the carrier to which user A belongs and requests the carrier server 4 to start charging user A. Receiving this request, the carrier to which user A belongs starts charging by searching necessary information in the user management/charging database 10. In step 805, the service provider server 8 sends a service corresponding to the access request of user B to user B via the carrier to which user B belongs.

Figure 22:
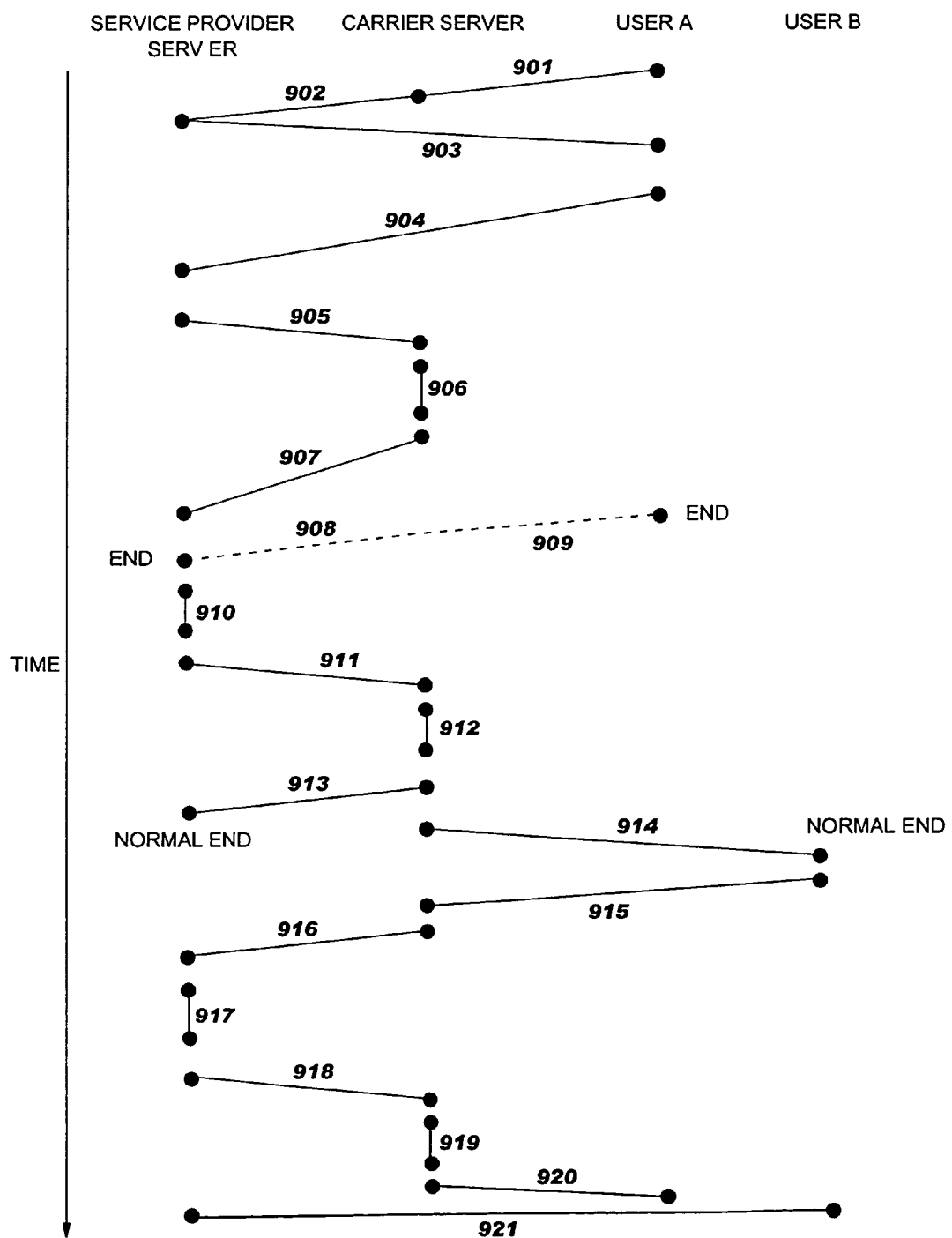
FIG. 22 is a time-series service presentation process executed with use of the content presentation method of the present invention.

FIG. 22 shows a time series transaction that involves the service provider server 8, the carrier server 4, and user A and user B. User A is connected to the carrier server 4 on the line 901 to be certified by the carrier server 4. After the user A is certified, the carrier server 4 establishes a connection to the service provider server 8 and requests a list of available services on the line 902. Then, the service provider server 8 returns the list of available services to user A via the carrier on the line 903.

On the line 904, user A sends a privilege product number (service one) enabled to access the object service and the phone number of the receiver cellular phone to the service provider server 8 via the carrier. On the line 905, the service provider sends the information of both presenter user A and receiver user B, as well as a predetermined price of the service one to the carrier server 4. On the line 906, the carrier server 4 decides whether or not user A can be charged for the service one. When the decision result is YES, the carrier server 4 communicates to the service provider server 8 that preparation has started to charge the predetermined price to the user A on the line 907. When the decision result is NO (the user A cannot be charged for the service or the user B cannot be presented with the service), the carrier server 4 communicates the impossibility to the service provider server 8 on the line 908, and the service provider side transaction is terminated. On the line 909, the carrier server 4 notifies user A of the impossibility of executing the purchase request, and the user A side transaction is terminated.

On the line 910, the service provider server 8 sets a privilege (Auth X) for user B to enable user B to receive a service purchased by user A. Then, on line 911, the service provider server 8 communicates with the carrier server 4 about an access privilege set for user B. After this, the carrier server 4 gets ready to charge user A on line 912. On the line 913, the carrier server 4 communicates the charge to the service provider server 8, and the service provider server 8 side transaction is terminated normally. On the line 914, the carrier server 4 of user B notifies user B of a service presented from user A by a call from a voice processing system or an arrival sound of an e-mail. Notified of the presentation from user A, user B is connected to the carrier server 4 and certified as a user on the line 915.

Completing the certification of the user B, the carrier server 4 transfers an access request from user B to the service provider server 8 on the line 916. The service provider server 8 then checks the access privilege of user B and enables user B to make the access on the line 917. The service provider server 8 communicates with the carrier server 4 to which user A belongs that permission has been granted to user B to make a requested access on the line 918. Then requests the carrier server 4 is requested to start charging. On the line 919, the carrier server 4 starts charging user A. The carrier server 4 then notifies user A of the access made by the user. Charging for the access is thus started on the line 920. On the line 921, the user B accesses the desired service via the carrier server 4 ending the transaction.

Figure 23:
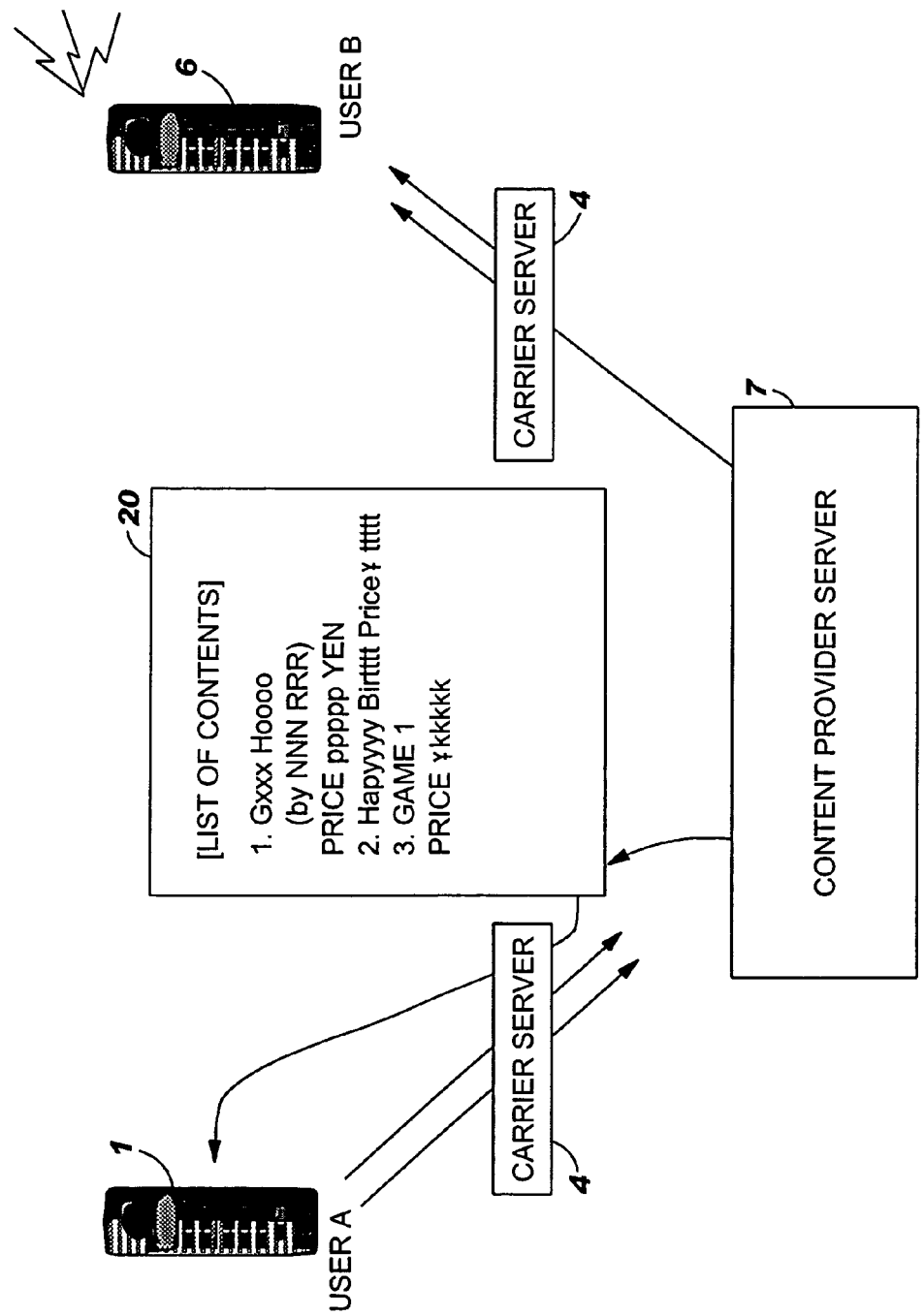
FIG. 23 is an embodiment of the content presentation method of the present invention.

FIG. 23 shows how a content (except for service use permitting information) is presented from user A to user B. The cellular phone 1 of user A requests a list of available content. The list 20 is obtained from the content provider server 7 via the carrier. User A of the cellular phone 1 then issues a request to the content provider server 7 via the carrier server 4. The request asks the server 7 for identification information, for example, identification of the phone number of user B of the cellular phone 6, thereby making presentation of content, for example, Game 1 selected from a list of content 20 with the push buttons.

After receiving this request, the carrier server 4 of user A identifies content from the content presentation request and reads the phone number of the receiver user B, then sends those items to the content provider server 7. After receiving the request, the content provider server 7 identifies the carrier to which user B belongs and the identification code by searching necessary information in the user management/ charging database 13 in advance. Then the server 7 requests user B's carrier to certify user B.

After the certification, the content provider server 7 sends the requested content to user B via user B's carrier. When sending the content, the carrier server 4 notifies user B of presentation of the content from user A by a call from a voice processing system or an e-mail that sounds at its arrival. User B's carrier charges user A when sending of the content is completed. Thus, the content presentation from user A is completed. In FIG. 23, the carrier servers for users A and B are separate, however, the same functionality is available when the users a and B belong to the same carrier.

FIG. 24 shows how content (except for service use permitting information) is presented from user A to user B. The cellular phone 1 of user A requests a list of available services 21 from the carrier. The list 21 is obtained from the service provider server 8 via the carrier server 4. User A of cellular phone 1 issues a request to the service provider server 8. The request is issued to present user B with a privilege for receiving a service, for example, Game 1 selected from the list 21 using push buttons. Identification information is obtained, for example, the phone number of user B of the cellular phone 6. The carrier server 4 of user A identifies the service from the service presentation request and reads the phone number of the receiver user B and sends the two items to the service provider server 8.

The service provider server 8 identifies both carrier and identification code of user B by searching in the user management/charging database 16 of the service provider server 8. The carrier of the user B is requested to check whether or not user A can be charged for the service, and then certifies user B. After certification, the service provider server 8 checks the restriction on user B to decide whether the service can be presented. When the decision result is YES, the service provider server 8 sets an access privilege for the service and notifies user B of the access privilege presented from user A via the carrier server of user B.

User B's carrier notifies user B of the presentation of the privilege to access a service by a call from a voice processing system or the content presentation from user A by an e-mail that sounds at its arrival. Notified of the access privilege presentation with the arrival sound of e-mail, user B accesses the service provider server 8 via the carrier. In this case, it may also be possible to send an e-mail including a URL linked address for identifying the service provider server 8 to user B to make access easier. The service provider server 8 knows the access from user B by searching for necessary information in the access control database 18, and then sends a request to user A's carrier to start charging user A. It is thus possible to charge the presented service to the service presenter A.

While a description has been made for embodiments of the present invention in detail with reference to the accompanying drawings, the present invention is not limited to those embodiments. The present invention makes it possible to use any well-known procedures and processes that can execute the content presentation method described above. In addition, the content presentation method of the present invention described above can be configured as a computer readable computer program, which can be described with object-oriented programming languages and algorithms, such as the C Language.

The computer program can also be recorded on a recording media such as floppy disk, hard disk, magnetic tape, CD-ROM, DVD, and optical magnetic disk. Furthermore, the present invention includes all the recording media that store the computer readable program for executing the content presentation method herein.

What is claimed is:

1. A provider server connected to a first cellular phone that requests presentation of content via a plurality of networks, a second cellular phone to be presented with said content, a slave provider server that holds said content, a first carrier server related to said first cellular phone, and a second carrier server related to said second cellular phone, comprising:
   a unit for receiving content information from said first cellular phone, identification information of said first cellular phone, stored in a database of said first carrier server, and information related to said second cellular phone; and
   a unit for sending said requested content to said second carrier server, wherein said second carrier server sends charging information related to said content to said first carrier server, wherein said content includes service use permitting information and said step of sending said charging information is executed after said second cellular phone makes an access to said service.

2. The provider server according to claim 1,
   wherein said provider server further includes a unit for issuing charging information by use of said identification information of said first cellular phone.

3. The provider server according to claim 2,
   wherein said provider server further includes a unit for identifying said network used by said second cellular phone.

4. A carrier server process for executing content presentation for providing content via a network, comprising the steps of:
   receiving a content presentation request from first cellular phone via a network;
   deciding content information, identification information of said first cellular phone, and information related to a second cellular phone assumed as a presentee included respectively in said received content presentation request;
   sending said content information, identification information of said content presentation request source unit, and information of said second cellular phone to a provider server;
   receiving charging information issued to said first cellular phone;
   including charging information of said content presentation in said charging information for said first cellular phone;
   wherein said content includes service use permitting information and said step of including said charging information is executed after said second cellular phone makes an access to said service; and
   changing a time for receiving said charging information according to the item of said requested content.

5. A computer readable recording medium that stores a computer program for executing a content presentation method for providing a content via a network, wherein said computer program executes the steps of:
   enabling a carrier server to receive a content presentation request from a first cellular phone via a network;
   deciding requested content information, identification information of said first cellular phone, and information related to a second cellular phone from said received content presentation request;
   sending said content information requested from said carrier server, identification information of said first cellular phone, and information related to said second cellular phone to a provider server respectively;

sending said requested content to said second cellular phone via a predetermined network; and enabling said provider server to send charging information issued to said first cellular phone to said first cellular phone via said carrier server;

wherein said method executed by said computer program stored on said recording medium further comprises the steps of:

changing a time for sending said charging information according to said content; and identifying said predetermined network used by said second cellular phone from information related to said second cellular phone, wherein said method includes still another step of sending of said charging information after said second cellular phone uses said service when said content is service use permitting information.

6. A computer readable recording medium that stores a provider server program for executing a content presentation method for providing a content via a network, comprising the steps of:

receiving requested content information, identification information of said first cellular phone, and information related to a second cellular phone to be presented with said content included respectively in a content presentation request sent from a first cellular phone to a carrier server via a network;

sending said requested content to a predetermined network to which said second cellular phone belongs with use of information related to said second cellular phone; and sending charging information related to said requested content to said carrier server at a time varied according to said requested content, wherein said content includes service use permitting information and said step of sending said charging information is executed after said second cellular phone makes an access to said service.

* * * * *

UNITED STATES PATENT AND TRADEMARK OFFICE
CERTIFICATE OF CORRECTION

PATENT NO. : 7,058,388 B2
APPLICATION NO. : 10/845049
DATED : June 6, 2006
INVENTOR(S) : Qi et al.

Page 1 of 1

It is certified that error appears in the above-identified patent and that said Letters Patent is hereby corrected as shown below:

Col. 2, line 6: after "SUMMARY" delete "OR" and insert --OF--.

Signed and Sealed this

Third Day of October, 2006

JON W. DUDAS
*Director of the United States Patent and Trademark Office*